(12) United States Patent
Kim et al.

(10) Patent No.: US 11,671,750 B2
(45) Date of Patent: Jun. 6, 2023

(54) VIBRATION DEVICE AND DISPLAY APPARATUS INCLUDING THE SAME

(71) Applicant: LG Display Co., Ltd., Seoul (KR)

(72) Inventors: Chiwan Kim, Paju-si (KR); YongWoo Lee, Paju-si (KR); SeongYong Uhm, Paju-si (KR); Sungwook Ko, Paju-si (KR); Uihyeon Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/218,605

(22) Filed: Mar. 31, 2021

(65) Prior Publication Data

US 2021/0306741 A1    Sep. 30, 2021

(30) Foreign Application Priority Data

Mar. 31, 2020    (KR) .......................... 10-2020-0039508

(51) Int. Cl.
| | |
|---|---|
| *H04R 1/40* | (2006.01) |
| *H04R 1/02* | (2006.01) |
| *H04R 3/12* | (2006.01) |
| *H04R 7/06* | (2006.01) |
| *H04R 17/00* | (2006.01) |
| *G06F 3/01* | (2006.01) |

(52) U.S. Cl.
CPC ............ *H04R 1/403* (2013.01); *H04R 1/028* (2013.01); *H04R 3/12* (2013.01); *H04R 7/06* (2013.01); *H04R 17/00* (2013.01); *G06F 3/016* (2013.01); *H04R 2201/401* (2013.01); *H04R 2400/11* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 8,119,022 B2 | 2/2012 | Lee et al. | |
| 10,341,774 B2 | 7/2019 | Inoue et al. | |
| 2013/0243224 A1 | 9/2013 | Onishi et al. | |
| 2017/0280216 A1 | 9/2017 | Lee et al. | |
| 2019/0028669 A1* | 1/2019 | Shin | G02F 1/133308 |
| 2019/0037164 A1* | 1/2019 | Kim | H04R 17/005 |
| 2019/0116406 A1 | 4/2019 | Ahn et al. | |

(Continued)

FOREIGN PATENT DOCUMENTS

| | | |
|---|---|---|
| CN | 203057505 U | 7/2013 |
| JP | H01-146499 A | 6/1989 |
| JP | 2000-324598 A | 11/2000 |

(Continued)

OTHER PUBLICATIONS

European Search Report dated Jul. 28, 2021 issued in corresponding International Patent Application No. 21166375.2.

(Continued)

*Primary Examiner* — James K Mooney
(74) *Attorney, Agent, or Firm* — Morgan, Lewis & Bockius LLP

(57) ABSTRACT

A vibration device enabling a large area and a display apparatus including the vibration device are provided. The vibration device may be configured to include a vibration array including a plurality of vibration modules which are spaced apart from one another by a first interval of less than 3 cm in a first direction.

40 Claims, 12 Drawing Sheets

(56) References Cited

U.S. PATENT DOCUMENTS

2020/0059733 A1* 2/2020 Shin ................ H04R 1/028

FOREIGN PATENT DOCUMENTS

| | | |
|---|---|---|
| JP | 2001223556 A | 8/2001 |
| JP | 2009-514765 A | 4/2009 |
| JP | 2014-072339 A | 4/2014 |
| JP | 2018-093469 A | 6/2018 |
| WO | 2010/005045 A | 1/2010 |
| WO | 2010/005045 A1 | 1/2010 |
| WO | 2017/069055 A | 4/2017 |
| WO | 2017/069055 A1 | 4/2017 |

OTHER PUBLICATIONS

Office Action dated Apr. 25, 2022 issued in corresponding Japanese Patent Application No. 20214-062244.
Office action dated Feb. 8, 2023 for European patent application No. 21166375.2.

* cited by examiner

VIBRATION DEVICE AND DISPLAY APPARATUS INCLUDING THE SAME

CROSS-REFERENCE TO RELATED APPLICATIONS

This application claims the benefit of and priority to Korean Patent Application No. 10-2020-0039508 filed on Mar. 31, 2020, the entirety of each which is hereby incorporated by reference.

TECHNICAL FIELD

The present disclosure relates to a vibration device and a display apparatus including the same.

DISCUSSION OF THE RELATED ART

Generally, in display apparatuses, a display panel displays an image, and a separate speaker should be installed for providing a sound. When a speaker is in a display apparatus, the speaker occupies a space; due to this, the design and spatial disposition of the display apparatus are limited.

A speaker applied to display apparatuses may be, for example, an actuator, including a magnet and a coil. However, when the actuator is applied to the display apparatuses, a thickness thereof is large. Piezoelectric elements that enable thinness to be implemented are attracting much attention.

Because the piezoelectric elements are fragile, the piezoelectric elements are easily damaged by an external impact. Thus, the reliability of sound reproduction is low, and it is difficult to increase a large area due to the limitation of size.

SUMMARY

Accordingly, embodiments of the present disclosure are directed to a vibration device and a display apparatus including the same that substantially obviate one or more problems due to limitations and disadvantages of the related art.

An aspect of the present disclosure is to provide a vibration device enabling a large area and a display apparatus including the vibration device.

Another aspect of the present disclosure is to provide a vibration device and a display apparatus including the same, which vibrate a display panel to generate a sound and are good in sound pressure level characteristic and sense of sound localization.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a vibration device comprises a vibration array configured to include a plurality of vibration modules, the plurality of vibration modules are configured to be spaced apart from one another by a first interval of less than 3 cm in a first direction.

In another aspect, a vibration device comprises a vibration array configured to include a plurality of vibration modules arranged in i×j form in a first direction and a second direction intersecting with each other on the same plane, where i is a natural number of 2 or more, and j is a natural number which is equal to i or is more than or equal to 1, the plurality of vibration modules are spaced apart from one another by an interval of less than 3 cm in each of the first direction and the second direction.

In another aspect, a display apparatus comprises a display panel configured to display an image; and a vibration apparatus including at least one vibration array disposed on a rear surface of the display panel to vibrate the display panel, the at least one vibration array includes a vibration device including a vibration array including a plurality of vibration modules, and the plurality of vibration modules are spaced apart from one another by a first interval of less than 3 cm in a first direction.

In another aspect, a display apparatus comprises a display panel configured to display an image; and a vibration apparatus including at least one vibration array disposed on a rear surface of the display panel to vibrate the display panel, the at least one vibration array includes a vibration device including a vibration array including a plurality of vibration modules arranged in i×j form in a first direction and a second direction intersecting with each other on the same plane, where i is a natural number of 2 or more, and j is a natural number which s equal to i or is more than or equal to 1, and the plurality of vibration modules are spaced apart from one another by an interval of less than 3 cm in each of the first direction and the second direction.

The vibration device according to some embodiments of the present disclosure may be implemented to have a large area by a plurality of vibration modules having a relatively small size, and thus, may have a structure which is advantage or easy to implement a large area.

In the vibration device according to some embodiments of the present disclosure, the plurality of vibration modules having a relatively small size may not independently vibrate but may vibrate as one large-area vibrator, and thus, a size may increase, thereby enhancing a sound characteristic and a sound pressure level characteristic of the low-pitched sound band.

The display apparatus according to some embodiments of the present disclosure may output a sound, generated by a vibration of the display panel based on a vibration of the vibration device, in a forward direction of the display panel, and a most region of the display panel may be vibrated by a large-area vibration device having a film-type, thereby more enhancing a sense of sound localization and a sound pressure level characteristic of a sound based on the vibration of the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory, and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
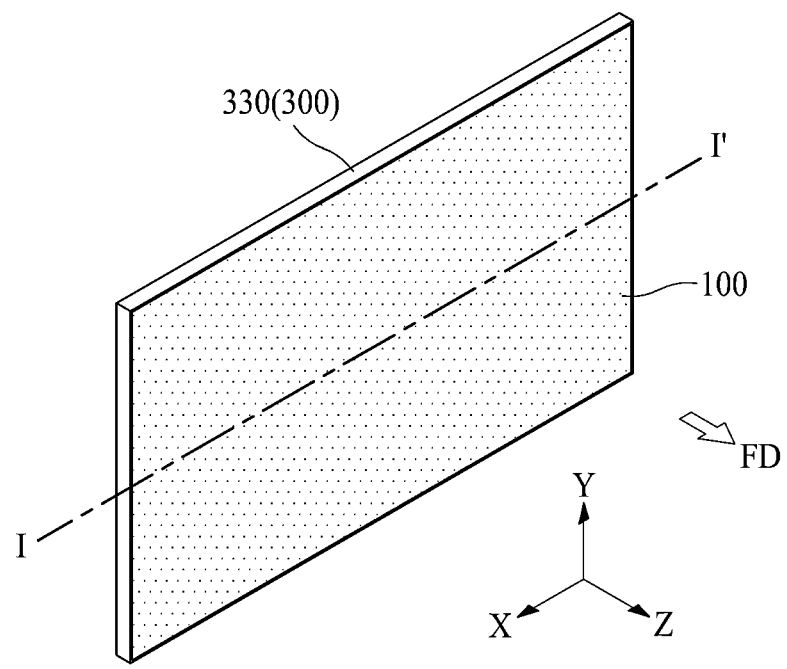
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present embodiment may use all types of display panels such as a liquid crystal display panel, an organic light emitting diode (OLED) display panel, and an electroluminescent display panel, but is not limited to a specific display panel, which is vibrated by a vibration device (or a vibration apparatus) according to an embodiment of the present disclosure to output a sound.

A shape or a size of a display panel applied to a display apparatus according to an embodiment of the present disclosure is not limited. For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

When the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, a light emitting layer, or the like). As another example, the layer provided on the array substrate may include a micro light emitting diode.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

In a case where a vibration device (or a vibration apparatus) using a piezoelectric element is implemented as a film-type so that a display panel of a display apparatus directly outputs a sound, a thickness of the display apparatus may be thin. A film-type vibration device may be manufactured to have a large area, and may be applied to a display apparatus having a large area. However, because the film-type vibration device is low in a piezoelectric characteristic, it may be difficult to apply the film-type vibration device to a large area due to a low vibration. When ceramic is used for enhancing a piezoelectric characteristic, the film-type vibration device may weak in durability, and a size of ceramic may be limited.

When a vibration device including a piezoelectric composite including piezoelectric ceramic is applied to a display apparatus, because the piezoelectric composite vibrates in a horizontal direction with respect to a left-right direction (for example, a horizontal direction with respect to a left-right direction of the display apparatus), it may unable to sufficiently vibrate the display apparatus in a vertical (or front-to-rear) direction. Thus, it may difficult to apply the vibration device to the display apparatus, and it may unable to output a desired sound to a forward region in front of the display apparatus. When a film-type piezoelectric element is applied to a display apparatus, a sound pressure level characteristic thereof may be lower than that of general speakers, such as exciters. When a stacked film-type piezoelectric element, in which a film-type piezoelectric element is configured with a multilayer to improve a sound pressure, is applied to a display apparatus, power consumption may increase, and a thickness of the display apparatus may be thickened.

When one vibration device is disposed on a rear surface of a display panel (for example, a rear surface of a mobile display apparatus), a mono sound may be output, but the inventors have recognized a problem where it is difficult to output a stereo sound. Therefore, a vibration device (or a sound device) may be further disposed at a periphery (or an edge) of a display panel so as to implement a stereo sound, but the inventors have recognized a problem where it is difficult to place an exciter in a flexible display apparatus where a curved portion is provided in a display panel, and when a speaker including piezoelectric ceramic is provided, the piezoelectric ceramic is brittle.

Therefore, the inventors have performed various experiments for implementing a vibration device which may realize a stereo sound characteristic, may be applied to a flexible display apparatus as well as a flat panel display apparatus, and may vibrate in a vertical (or front-to-rear) direction with respect to a horizontal direction (or a width-wise direction) of the display panel. Through the various experiments, the inventors have invented a display apparatus including a vibration device having a new structure, which may realize a stereo sound characteristic and may enabling a large area. This will be described below in detail.

Figure 2:
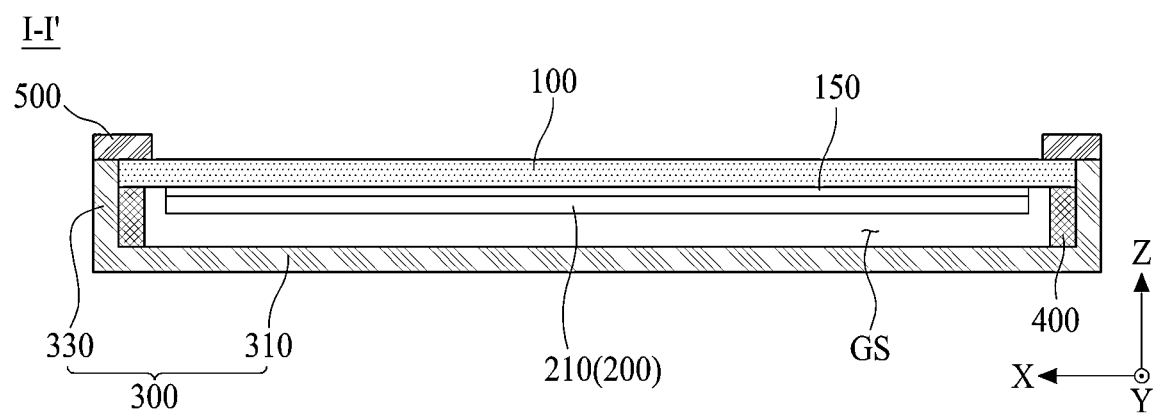
FIG. 2 is a cross-sectional view taken along line I-I' illustrated in FIG. 1.

FIG. 1 illustrates a display apparatus according to an embodiment of the present disclosure. FIG. 2 is a cross-sectional view taken along line I-I' illustrated in FIG. 1.

With reference to FIGS. 1 and 2, a display apparatus according to an embodiment of the present disclosure may include a display panel 100 and a vibration device 200 on a rear surface of the display panel 100. A "rear surface" may denote a surface of the display panel 100 opposite to a front surface of the display panel 100 including the display area for displaying an image.

The display panel 100 may display an electronic image or a digital image. For example, the display panel 100 may output light to display an image.

According an embodiment of the present disclosure, the display panel 100 may be a curved display panel, or may be any type of display panel, such as a liquid crystal display panel, an organic light-emitting display panel, a quantum dot light-emitting display panel, a micro light-emitting diode display panel, an electrophoresis display panel, and an electro-wetting display panel. According another embodiment of the present disclosure, the display panel 100 may a flexible display panel. For example, the display panel 100 may a flexible liquid crystal display panel, a flexible organic light-emitting display panel, a flexible quantum dot light-emitting display, a flexible micro light emitting diode display panel, a flexible electrophoretic display panel, or a flexible electro-wetting display panel, but embodiments of the present disclosure are not limited thereto. According to another embodiment of the present disclosure, the display panel 100 may be a display panel with integrated touch panel. For example, the display panel with integrated touch panel may include a touch panel attached on a display panel, or may include a touch electrode layer disposed in the display panel.

The display panel 100 according to an embodiment of the present disclosure may include a display area, which displays an image based on driving of a plurality of pixels arranged on a substrate, and a non-display area which surrounds the display area. For example, the display panel 100 may be implemented so that an entire front surface of the substrate is implemented as the display area without the non-display area, in case of a non-bezel (or bezel-less) structure. For example, the display panel 100 may be a transparent display panel which includes a light transmission portion disposed in at least one of the plurality of pixels.

The display panel 100 according to an embodiment of the present disclosure may include a pixel array layer (or a display unit) configured to include an anode electrode, a cathode electrode, and a light emitting device layer. The display panel 100 may be configured to display an image in a type such as a top emission type, a bottom emission type, or a dual emission type, based on a structure of the pixel array layer. For example, in the top emission type, an image may be displayed by outputting visible light generated from the pixel array layer to the forward region in front of a base substrate of the display panel 100. In the bottom emission type, an image may be displayed by outputting visible light generated from the pixel array layer to the backward region in rear of a base substrate of the display panel 100. The micro light emitting diode device may be a light emitting diode implemented as an integrated circuit (IC) or chip type and may include a first terminal electrically connected to the anode electrode and a second terminal electrically connected to the cathode electrode. The cathode electrode may be connected to a light emitting device of a light emitting device layer provided in each pixel area in common.

The display panel 100 according to an embodiment of the present disclosure may include a bending portion that may be bent or curved to have a curved shape or a certain curvature radius.

The bending portion of the display panel 100 may be implemented in at least one of one periphery (or an edge) and the other periphery of the display panel 100, which are parallel to each other. The one periphery and/or the other periphery, where the bending portion is implemented, of the display panel 100 may include only the non-display area, or may include both the non-display area and a periphery (or an edge) of the display area. For example, the display panel 100 including the bending portion implemented by bending of the non-display area may have a one-side bezel bending structure or a both-side bezel bending structure. Also, the display panel 100 including the bending portion implemented by bending of the periphery (or the edge) of the display area and the non-display area may have a one-side active bending structure or a both-side active bending structure.

The display apparatus according to an embodiment of the present disclosure may further include a supporting member 300 disposed at a rear surface of the display panel 100 and a panel connection member 400 disposed between the display panel 100 and the supporting member 300.

The supporting member 300 may be referred to, for example, as a cover bottom, a plate bottom, a back cover, a base frame, a metal frame, a metal chassis, a chassis base, or an in-chassis. Therefore, the supporting member 300 may be a supporter that supports the display panel 100, and may be implemented as a frame or a plate structure of an arbitrary type, on a rear surface of the display apparatus. The supporting member 300 may be a rear surface structure or a rear structure.

The supporting member 300 may cover a rear surface of the display panel 100. For example, the supporting member 300 may cover a whole rear surface of the display panel 100 with a gap space GS therebetween. For example, the supporting member 300 according to an embodiment of the present disclosure may include at least one of a glass material, a metal material, and a plastic material. For example, a periphery or a sharp corner of the supporting member 300 may have an inclined shape or a curved shape, e.g., through a chamfer process or a corner rounding process. For example, the supporting member 300 of the glass material may be sapphire glass. For example, the supporting member 300 of the metal material may include one or more of aluminum (Al), an Al alloy, a magnesium (Mg), a Mg alloy, and an iron (Fe)-nickel (Ni) alloy.

The supporting member 300 according to an embodiment of the present disclosure may additionally cover a side surface of the display panel 100. For example, the supporting member 300 may include a rear part 310 that covers the rear surface of the display panel 100 with the gap space GS therebetween, and a side part 330 connected to an end of the rear part 310 and covering the side surface of the display panel 100. However, embodiments of the present disclosure are not limited thereto. For example, the rear part 310 and the side part 330 of the supporting member 300 may be integrated as one body.

The side part 330 may be implemented as a separated middle frame coupled (or connected) to the rear part 310. For example, the side part 330 implemented as the middle frame may cover the supporting member 300, and for example, may cover all of a side surface of the rear part 310 and the side surface of the display panel 100. For example, the side part 330 implemented as the middle frame may include a material that is the same as or different from that of the supporting member 300 among a metal material and plastic material.

The supporting member 300 according to an embodiment of the present disclosure may be coupled (or connected) to a rear periphery (or a rear edge) of the display panel 100 using a panel connection member 400. For example, the panel connection member 400 may be disposed between the rear periphery of the display panel 100 and a periphery (or an edge) of the supporting member 300, and may attach the display panel 100 to the supporting member 300. The panel connection member 400 according to an embodiment of the present disclosure may be implemented with a double-sided tape, a single-sided tape, or a double-sided adhesive foam pad, but embodiments of the present disclosure are not limited thereto.

The display apparatus according to an embodiment of the present disclosure may further include a front member 500 that covers a periphery (or edge) of a front surface of the display panel 100. The front member 500 may have a frame shape that may include an opening overlapping the display area of the display panel 100. For example, the front member 500 may be coupled (or connected) to the side part 330 of the supporting member 300 or the middle frame, and may cover the periphery of the front surface of the display panel 100, thereby supporting or fixing the display panel 100. The front member 500 may be in the periphery of the front surface of the display panel 100, and may be directly exposed (visible) to a user (or a viewer). Thus, an aesthetic design appearance of the display apparatus may be reduced, and a bezel width of the display apparatus may increase. To solve such a problem, the display panel 100 may be coupled (or connected) to the supporting member 300 by the panel connection member 400. Thus, the front member 500 may be omitted (or removed), thereby decreasing the bezel width of the display apparatus and enhancing the aesthetic design appearance of the display apparatus.

The vibration device 200 may be on the rear surface (or a back surface) of the display panel 100. The vibration device 200 may include a vibration array 210 coupled (or connected) to the rear surface (or a back surface) of the display panel 100.

The vibration device 200 may be referred to as, for example, a sound generating device, a sound generating module, a film actuator, a film-type piezoelectric composite actuator, a film speaker, a film-type piezoelectric speaker, a film-type piezoelectric composite speaker, or an ultrasonic transmitting and receiving device that each uses the display panel 100 as a vibration plate, but the term is not limited thereto.

The vibration array 210 may be disposed to the rear surface of the display panel 100 by an adhesive member 150.

The adhesive member 150 according to an embodiment of the present disclosure may be between the rear surface of the display panel 100 and the vibration array 210. For example, the adhesive member 150 may include an adhesive or a double-sided adhesive tape, including an adhesive layer that has a good adhesive force or attaching force between the vibration array 210 and the rear surface of the display panel 100. For example, the adhesive layer of the adhesive member 150 may include one or more of epoxy, acryl, silicone, or urethane, but embodiments are not limited thereto. The adhesive layer of the adhesive member 150 may further include an additive, such as a tackifier or an adhesion enhancing agent, a wax component, or an anti-oxidation agent.

The adhesive member 150 according to another embodiment of the present disclosure may further include a hollow portion between the display panel 100 and the vibration array 210. The hollow portion of the adhesive member 150 may provide an air gap between the display panel 100 and the vibration array 210. Due to the air gap, a sound wave (or a sound pressure) based on a vibration of the vibration array 210 may not be dispersed by the adhesive member 150, and may concentrate on the display panel 100. Thus, the loss of a vibration caused by the adhesive member 150 may be minimized or reduced, thereby increasing a sound pressure level characteristic of a sound generated based on a vibration of the display panel 100.

The vibration array 210 according to an embodiment of the present disclosure may be implemented as a film-type. The vibration array 210 may have a thickness that is thinner than that of the display panel 100. Thus, a thickness of the display panel 100 may not increase, despite the presence of the vibration array 210.

The vibration array 210 may be disposed on the rear surface of the display panel 100 to overlap the display area of the display panel 100. For example, the vibration array 210 may overlap half or more of the display area of the display panel 100. As another example, the vibration array 210 may overlap the whole display area of the display panel 100.

The vibration array 210 according to an embodiment of the present disclosure may vibrate by alternately contract and expand based on an inverse piezoelectric effect when an alternating current (AC) voltage is applied, thereby directly vibrating the display panel 100 through the vibration thereof. As one example, the vibration array 210 may vibrate according to a signal, preferably a sound or voice signal synchronized with an image displayed by the display panel 100 to vibrate the display panel 100. As another example, the vibration array 210 may be on the display panel 100, and may vibrate according to a haptic feedback signal (or a tactile feedback signal) synchronized with a user touch applied to a touch panel (or a touch sensor layer) embedded into the display panel 100 to vibrate the display panel 100. Accordingly, the display panel 100 may vibrate based on a vibration of the vibration array 210 to provide a user (or a viewer) with at least one or more of sound and a haptic feedback. Embodiments are not limited to the above examples.

Therefore, the display apparatus according to an embodiment of the present disclosure may output a sound, generated by a vibration of the display panel 100 based on a vibration of the vibration array 210, in a forward direction FD of the display panel. Also, in the display apparatus according to an embodiment of the present disclosure, a most region of the display panel 100 may be vibrated by the large-area vibration array 210 having a film-type, thereby more enhancing a sense of sound localization and a sound pressure level characteristic of a sound based on the vibration of the display panel 100.

Figure 3:
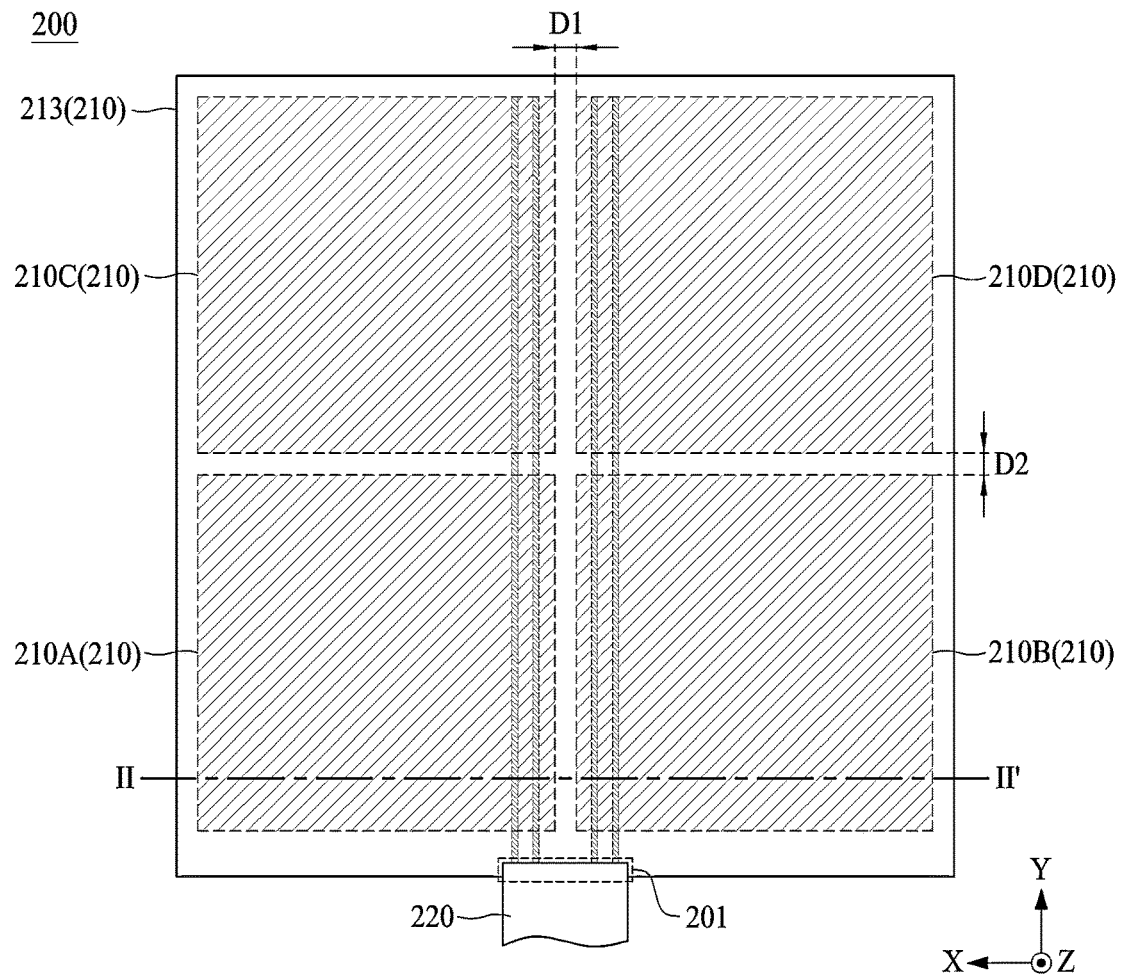
FIG. 3 illustrates a vibration device according to an embodiment of the present disclosure.
Figure 4:
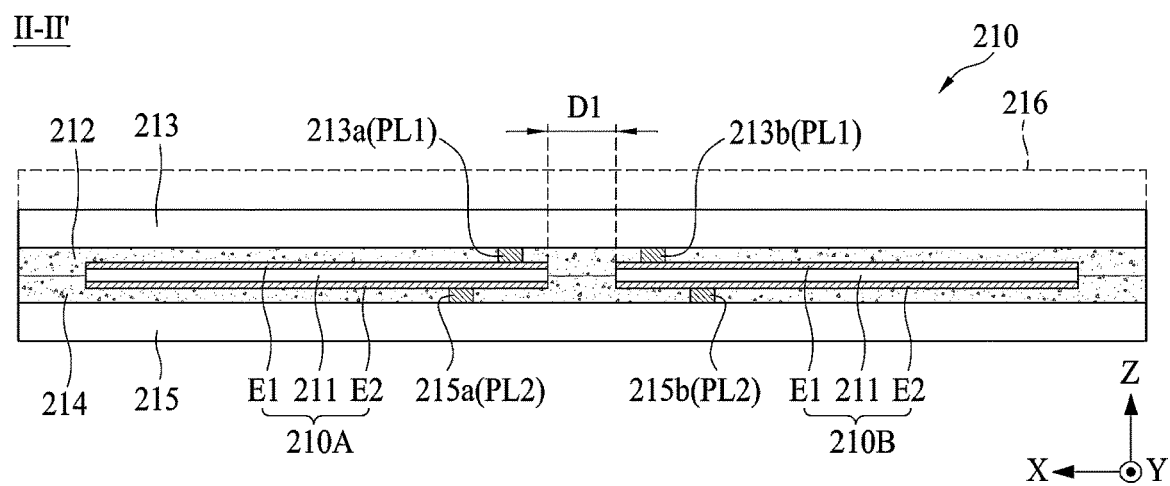
FIG. 4 is a cross-sectional view taken along line II-II' illustrated in FIG. 3.

FIG. 3 illustrates a vibration device according to an embodiment of the present disclosure. FIG. 4 is a cross-sectional view taken along line II-II' illustrated in FIG. 3 and illustrates the vibration device illustrated in FIG. 2.

With reference to FIGS. 2 to 4, the vibration device according to an embodiment of the present disclosure may include a vibration array 210.

The vibration array 210 according to an embodiment of the present disclosure may include a plurality of vibration modules 210A to 210D which are electrically and/or structurally disconnected from one another and are disposed spaced apart from one another in a first direction X (or a widthwise direction) and a second direction Y (or a lengthwise direction) intersecting with the first direction X. Each of the plurality of vibration modules 210A to 210D may alternately and/or repeatedly contract and expand based on a piezoelectric effect (or a piezoelectric characteristic) to vibrate. The vibration array 210 according to an embodiment of the present disclosure may alternately and/or repeatedly contract and expand based on an inverse piezoelectric effect (or a piezoelectric characteristic) to vibrate in a thickness direction Z, thereby directly vibrating the display panel 100. The vibration array 210 may include the plurality of vibration modules 210A to 210D which are arranged or tiled at a certain interval. The vibration array 210 may be referred to as, for example, a vibration array portion, a vibration module array portion, a vibration array structure, a tiling vibration array, a tiling vibration module, or a tiling vibration film.

Each of the plurality of vibration modules 210A to 210D according to an embodiment of the present disclosure may have a tetragonal shape having a width of about 5 cm or more. For example, each of the plurality of vibration modules 210A to 210D may have a square shape having a size of 5 cm×5 cm or more.

The plurality of vibration modules 210A to 210D may be arranged or tiled in i×j form on the same plane, and thus, the vibration array 210 may have an enlarged area based on tiling of the plurality of vibration modules 210A to 210D having a relatively small size. For example, i may be the number of vibration modules arranged in the first direction X or may be a natural number of 2 or more, and j may be the number of vibration modules arranged in the second direction Y or may be a natural number of 1 or more which is the same as or different from i.

The plurality of vibration modules 210A to 210D may be arranged or tiled at a certain interval (or distance), and thus, may be implemented as one vibration device (or a single vibration device) which is driven as one complete single body without being independently driven. According to an embodiment of the present disclosure, with respect to the first direction X, a first separation distance (or first distance or first interval) D1 between the plurality of vibration modules 210A to 210D may be 0.1 mm or more and less than 3 cm. Also, with respect to the second direction Y, a second separation distance (or second distance or second interval) D2 between the plurality of vibration modules 210A to 210D may be 0.1 mm or more and less than 3 cm. For example, the first separation distance D1 may be the same as the second separation distance D2. For example, the first separation distance D1 may be the same as the second separation distance D2 within a process error range.

According to an embodiment of the present disclosure, the plurality of vibration modules 210A to 210D may be arranged or tiled to have the separation distances (or intervals) D1 and D2 of 0.1 mm or more and less than 3 cm, and thus, may be driven as one vibration device, thereby increasing a reproduction band and a sound pressure level characteristic of a sound which is generated based on a single vibration of the plurality of vibration modules 210A to 210D. For example, the plurality of vibration modules 210A to 210D may be arranged at an interval of 0.1 mm or more and less than 5 mm, in order to increase a reproduction band of a sound generated based on a single vibration of the plurality of vibration modules 210A to 210D and to increase a sound of a low-pitched sound band (for example, a sound pressure level characteristic in 500 Hz or less).

According to an embodiment of the present disclosure, in a case where the plurality of vibration modules 210A to 210D are arranged at the intervals D1 and D2 of less than 0.1 mm or without the intervals D1 and D2, the reliability of the vibration modules 210A to 210D or the vibration array 210 may be reduced due to damage or a crack caused by a physical contact therebetween which occurs when each of the vibration modules 210A to 210D vibrates.

According to an embodiment of the present disclosure, in a case where the plurality of vibration modules 210A to 210D are arranged at the intervals D1 and D2 of 3 cm or more, the plurality of vibration modules 210A to 210D may not be driven as one vibration device due to an independent vibration of each of the plurality of vibration modules 210A to 210D. Therefore, a reproduction band and a sound pressure level characteristic of a sound which is generated based on vibrations of the plurality of vibration modules 210A to 210D may be reduced. For example, in a case where the plurality of vibration modules 210A to 210D are arranged at the intervals D1 and D2 of 3 cm or more, a sound characteristic and a sound pressure level characteristic of the low-pitched sound band (for example, in 500 Hz or less) may each be reduced.

According to an embodiment of the present disclosure, in a case where the plurality of vibration modules 210A to 210D are arranged at an interval of 5 mm, each of the plurality of vibration modules 210A to 210D may not be perfectly driven as one vibration device, and thus, a sound characteristic and a sound pressure level characteristic of the low-pitched sound band (for example, in 200 Hz or less) may each be reduced.

According to another embodiment of the present disclosure, in a case where the plurality of vibration modules 210A to 210D are arranged at an interval of 1 mm, each of the plurality of vibration modules 210A to 210D may be driven as one vibration device, and thus, a reproduction band of a sound may increase and a sound of the low-pitched sound band (for example, a sound pressure level characteristic in 500 Hz or less) may increase. For example, in a case where the plurality of vibration modules 210A to 210D are arranged at an interval of 1 mm, the vibration array 210 may be implemented as a large-area vibrator which is enlarged based on optimization of a separation distance between the plurality of vibration modules 210A to 210D. Therefore, the vibration array 210 may be driven as a large-area vibrator based on a single vibration of the plurality of vibration modules 210A to 210D, and thus, a sound characteristic and a sound pressure level characteristic may each increase in the low-pitched sound band and a reproduction band of a sound generated based on a large-area vibration of the vibration array 210.

Therefore, in order to implement a single vibration (or one vibration device) of the plurality of vibration modules 210A to 210D, a separation distance between the plurality of vibration modules 210A to 210D may be adjusted to 0.1 mm or more and less than 3 cm. Also, in order to implement a single vibration (or one vibration device) of the plurality of vibration modules 210A to 210D and to increase a sound pressure level characteristic of a sound of the low-pitched sound band, the separation distance between the plurality of vibration modules 210A to 210D may be adjusted to 0.1 mm or more and less than 5 mm.

The vibration array 210 according to an embodiment of the present disclosure may include first to fourth vibration modules 210A to 210D which are electrically disconnected and/or structurally separated from one another and are disposed spaced apart from one another in each of the first direction X and the second direction Y. For example, the first to fourth vibration modules 210A to 210D may be arranged or tiled in 2×2 form.

According to an embodiment of the present disclosure, the first and second vibration modules 210A and 210B may be spaced apart from each other in the first direction X. The third and fourth vibration modules 210C and 210D may be spaced apart from each other in the first direction X and may be spaced apart from each of the first and second vibration modules 210A and 210B in the second direction Y. The first and third vibration modules 210A and 210C may be spaced apart from each other in the second direction Y to face each other. The second and fourth vibration modules 210B and 210D may be spaced apart from each other in the second direction Y to face each other.

According to an embodiment of the present disclosure, the first to fourth vibration modules 210A to 210D may be arranged (or tiled) at the intervals D1 and D2 of 0.1 mm or more and less than 3 cm or may be arranged (or tiled) at the interval of 0.1 mm or more and less than 5 mm in each of the first direction X and the second direction Y, so that the first to fourth vibration modules 210A to 210D are driven as one vibration device or are driven for a single vibration or a vibration of a large-area vibrator of the vibration array 210.

Each of the first to fourth vibration modules 210A to 210D according to an embodiment of the present disclosure may include a piezoelectric layer 211, a first electrode layer E1, and a second electrode layer E2.

The piezoelectric layer 211 may include at least one of a piezoelectric material, a composite piezoelectric material, or an electro active material which has a piezoelectric effect. The piezoelectric layer 211 may be referred to as the other term such as a vibration layer, a piezoelectric material layer, a piezoelectric composite layer, an electro active layer, a vibration portion, a piezoelectric material portion, a piezoelectric composite portion, an electro active portion, a piezoelectric structure, a piezoelectric composite, or a piezoelectric ceramic composite.

The piezoelectric layer 211 according to an embodiment of the present disclosure may include a ceramic-based material capable of realizing a relatively high vibration. For example, the piezoelectric layer 211 may include a 1-3 composite having a piezoelectric characteristic of a 1-3 vibration mode or a 2-2 composite having a piezoelectric characteristic of a 2-2 vibration mode. For example, a piezoelectric deformation coefficient "$d_{33}$" of the piezoelectric layer 211 in a thickness direction Z may have 1,000 pC/N or more, but embodiments are not limited thereto.

Figure 5A:
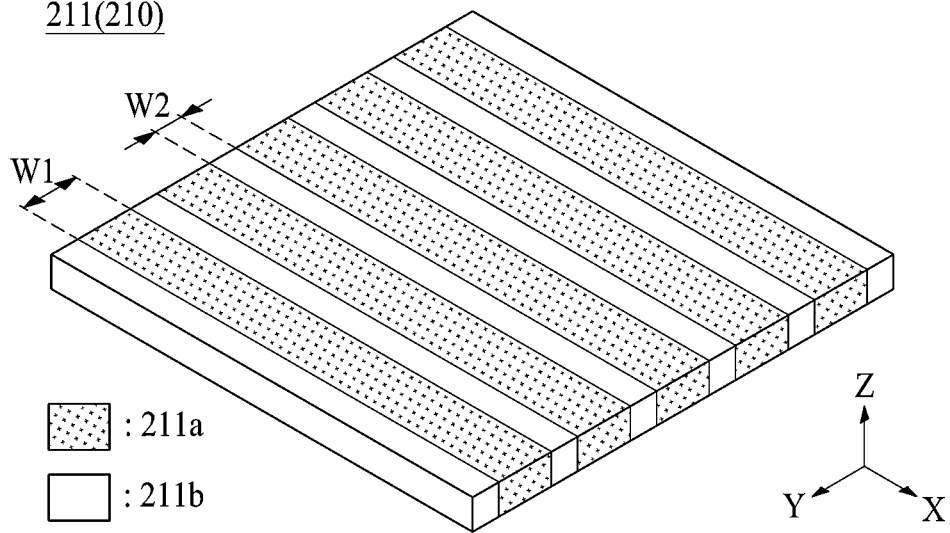
FIGS. 5A to 5F illustrate a piezoelectric layer of the vibration modules illustrated in FIG. 4.
Figure 5B:
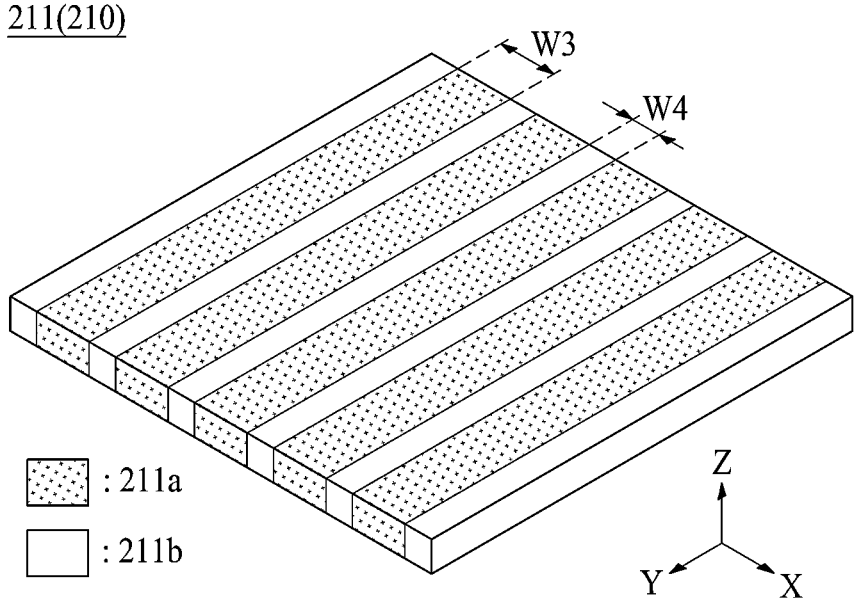

The properties of a composite are strongly associated with the connectivity of its components, wherein a connectivity is defined as the arrangement of the active and passive phases in the composite. Therefore, a 2-2 composite or connectivity includes of alternating layers of the two phases, as illustrated in FIG. 5A or 5B.

The first electrode layer E1 may be disposed on a first surface (or an upper surface) of the piezoelectric layer 211 and may be electrically connected to the first surface of the piezoelectric layer 211. For example, the first electrode layer E1 may have a common electrode type disposed on entire of the first surface of the piezoelectric layer 211.

The first electrode layer E1 according an embodiment of the present disclosure may include a transparent conductive material, a semitransparent (or translucent) conductive material, or an opaque conductive material. For example, examples of the transparent conductive material or the semitransparent conductive material may include indium tin oxide (ITO) or indium zinc oxide (IZO), but embodiments are not limited thereto. Examples of the opaque conductive material may include aluminum (Al), copper (Cu), gold (Au), silver (Ag), molybdenum (Mo), magnesium (Mg), and an alloy of any thereof, but embodiments are not limited thereto.

The second electrode layer E2 may be on a second surface (e.g., a rear surface) opposite to the first surface of the piezoelectric layer 211, and may be electrically connected to the second surface of the piezoelectric layer 211. For example, the second electrode layer E2 may have a common electrode type disposed on entire of the second surface of the piezoelectric layer 211. The second electrode layer E2 according to an embodiment of the present disclosure may include a transparent conductive material, a semitransparent conductive material, or an opaque conductive material. For example, the second electrode layer E2 may include the same material as that of the first electrode layer E1, but embodiments are not limited thereto. As another example, the second electrode layer E2 may include a material different from that of the first electrode layer E1.

Therefore, each of the first to fourth vibration modules 210A has its own first electrode E1 and second electrode E2 and the piezoelectric layer 211 in between.

The piezoelectric layer 211 may be polarized by a certain voltage applied to the first electrode layer E1 and the second electrode layer E2 in a certain temperature atmosphere, or in a temperature atmosphere that may be changed from a high temperature to a room temperature. Embodiments are not limited to these examples.

The vibration array 210 according to an embodiment of the present disclosure may further include a first protection member 213 and a second protection member 215.

The first protection member 213 may be disposed on the first surface of the vibration array 210. For example, the first protection member 213 may cover the first electrode layer E1 disposed on a first surface of each of the plurality of vibration modules 210A to 210D, and thus, may be connected to the first surface of each of the plurality of vibration modules 210A to 210D in common or may support the first surface of each of the plurality of vibration modules 210A to 210D in common. Accordingly, the first protection member 213 may protect the first surface of each of the plurality of vibration modules 210A to 210D or the first electrode layer E1.

The first protection member 213 may be disposed on the first surface of each of the plurality of vibration modules 210A to 210D by a first adhesive layer 212. For example, the first protection member 213 may be directly disposed on the first surface of each of the plurality of vibration modules 210A to 210D by a film laminating process using the first adhesive layer 212. Accordingly, the plurality of vibration modules 210A to 210D may be integrated (or disposed) or tiled with the first protection member 213 to have the certain intervals D1 and D2.

The second protection member 215 may be disposed on the second surface of the vibration array 210. For example, the second protection member 215 may cover the second electrode layer E2 disposed on a second surface of each of the plurality of vibration modules 210A to 210D, and thus, may be connected to the second surface of each of the plurality of vibration modules 210A to 210D in common or may support the second surface of each of the plurality of vibration modules 210A to 210D in common. Accordingly, the second protection member 215 may protect the second surface of each of the plurality of vibration modules 210A to 210D or the second electrode layer E2.

The second protection member 215 may be disposed on the second surface of each of the plurality of vibration modules 210A to 210D by a second adhesive layer 214. For example, the second protection member 215 may be directly disposed on the second surface of each of the plurality of vibration modules 210A to 210D by a film laminating process using the second adhesive layer 214. Accordingly, the plurality of vibration modules 210A to 210D may be integrated (or disposed) or tiled with the second protection member 215 to have the certain intervals D1 and D2.

Each of the first protection member 213 and the second protection member 215 according to an embodiment of the present disclosure may include a plastic film. For example, each of the first protection member 213 and the second protection member 215 may be a polyimide (PI) film or a polyethyleneterephthalate (PET) film, but embodiments of the present disclosure are not limited thereto.

The first adhesive layer 212 may be disposed between the first surface of each of the plurality of vibration modules 210A to 210D and the first protection member 213 and between the plurality of vibration modules 210A to 210D. For example, the first adhesive layer 212 may be formed on a rear surface (or an inner surface) of the first protection member 213 facing the first surface of the vibration array 210, disposed on the first surface of each of the plurality of vibration modules 210A to 210D, and filled between the plurality of vibration modules 210A to 210D.

The second adhesive layer 214 may be disposed between the second surface of each of the plurality of vibration modules 210A to 210D and the second protection member 215 and between the plurality of vibration modules 210A to 210D. For example, the second adhesive layer 214 may be formed on a front surface (or an inner surface) of the second protection member 215 facing the second surface of the vibration array 210, disposed on the second surface of each of the plurality of vibration modules 210A to 210D, and filled between the plurality of vibration modules 210A to 210D.

The first and second adhesive layers 212 and 214 may be connected to each other between the plurality of vibration modules 210A to 210D. Therefore, each of the plurality of vibration modules 210A to 210D may be surrounded by the first and second adhesive layers 212 and 214. For example, the first and second adhesive layers 212 and 214 may entirely surround the whole plurality of vibration modules 210A to 210D. For example, the plurality of vibration modules 210A to 210D may be embedded between the first and second adhesive layers 212 and 214. For example, the first and second adhesive layers 212 and 214 may be referred to as a cover member, but embodiments are not limited thereto. When each of the first and second adhesive layers 212 and 214 is a cover member, the first protection member 213 may be disposed on a first surface of the cover member, and the second protection member 215 may be disposed on a second surface of the cover member.

Each of the first and second adhesive layers 212 and 214 according to an embodiment of the present disclosure may include an electric insulating material which has adhesiveness and is capable of compression and decompression. For example, each of the first and second adhesive layers 212 and 214 may include an epoxy resin, an acryl resin, a silicone resin, or a urethane resin, but embodiments are not limited thereto.

The vibration device 200 or the vibration array 210 according to an embodiment of the present disclosure may further include a first power supply line PL1 disposed in the first protection member 213, a second power supply line PL2 disposed in the second protection member 215, and a pad part 201 electrically connected to the first power supply line PL1 and the second power supply line PL2.

The first power supply line PL1 may be disposed on a rear surface of the first protection member 213 facing the first surface of the vibration array 210. The first power supply line PL1 may be electrically connected to the first electrode layer E1 of each of the plurality of vibration modules 210A to 210D. For example, the first power supply line PL1 may be directly and electrically connected to the first electrode layer E1 of each of the plurality of vibration modules 210A to 210D. For example, the first power supply line PL1 may be electrically connected to the first electrode layer E1 of each of the plurality of vibration modules 210A to 210D by an anisotropic conductive film. As another example, the first power supply line PL1 may be electrically connected to the first electrode layer E1 of each of the plurality of vibration modules 210A to 210D by a conductive material (or particle) included in the first adhesive layer 212.

The first power supply line PL1 according to an embodiment of the present disclosure may include first and second upper power lines 213a and 213b disposed in a second direction Y. For example, the first upper power line 213a may be electrically connected to the first electrode layer E1 of each of the first and third vibration modules 210A and 210C (or a first module group) arranged in a first column parallel to the second direction Y among the plurality of vibration modules 210A to 210D. The second upper power line 213b may be electrically connected to the first electrode layer E1 of each of the second and fourth vibration modules 210B and 210D (or a second module group) arranged in a second column parallel to the second direction Y among the plurality of vibration modules 210A to 210D.

The second power supply line PL2 may be disposed on a front surface of the second protection member 215 facing the second surface of the vibration array 210. The second power supply line PL2 may be electrically connected to the second electrode layer E2 of each of the plurality of vibration modules 210A to 210D. For example, the second power supply line PL2 may be directly and electrically connected to the second electrode layer E2 of each of the plurality of vibration modules 210A to 210D. For example, the second power supply line PL2 may be electrically connected to the second electrode layer E2 of each of the plurality of vibration modules 210A to 210D by an anisotropic conductive film. As another example, the second power supply line PL2 may be electrically connected to the second electrode layer E2 of each of the plurality of vibration modules 210A to 210D by a conductive material (or particle) included in the second adhesive layer 214.

The second power supply line PL2 according to an embodiment of the present disclosure may include first and second lower power lines 215a and 215b disposed in a second direction Y. For example, the first lower power line 215a may be electrically connected to the second electrode layer E2 of each of the first and third vibration modules 210A and 210C (or a first module group) arranged in the first column parallel to the second direction Y among the plurality of vibration modules 210A to 210D. The second lower power line 215b may be electrically connected to the second electrode layer E2 of each of the second and fourth vibration modules 210B and 210D (or a second module group) arranged in the second column parallel to the second direction Y among the plurality of vibration modules 210A to 210D.

The pad part 201 may be disposed in the vibration array 210 so as to be electrically connected to one portion (or one end or one side) of each of the first power supply line PL1 and the second power supply line PL2. The pad part 201 according to an embodiment of the present disclosure may include a first pad electrode electrically connected to one portion of the first power supply line PL1 and a second pad electrode electrically connected to one portion of the second power supply line PL2.

The first pad electrode may be connected to one portion of each of the first and second upper power lines 213a and 213b of the first power supply line PL1. For example, the one portion of each of the first and second upper power lines 213a and 213b may branch from the first pad electrode.

The second pad electrode may be connected to one portion of each of the first and second lower power lines 215a and 215b of the second power supply line PL2. For example, the one portion of each of the first and second lower power lines 215a and 215b may branch from the second pad electrode.

The vibration device 200 or the vibration array 210 according to an embodiment of the present disclosure may further include a flexible cable 220.

The flexible cable 220 may be electrically connected to the pad part 201 disposed in the vibration array 210 and may supply the vibration array 210 with one or more vibration driving signals (or a sound signal) provided from a sound processing circuit. The flexible cable 220 according to an embodiment of the present disclosure may include a first terminal electrically connected to the first pad electrode of the pad part 201 and a second terminal electrically connected to the second pad electrode of the pad part 201. For example, the flexible cable 220 may be a flexible printed circuit cable or a flexible flat cable, but embodiments are not limited thereto.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode layer E1 of each of the plurality of vibration modules 210A to 210D through a first terminal of the flexible cable 220, the first pad electrode of the pad part 201, and the first power supply line PL1. The second vibration driving signal may be supplied to the second electrode layer E2 of each of the plurality of vibration modules 210A to 210D through a second terminal of the flexible cable 220, the second pad electrode of the pad part 201, and the second power supply line PL2.

The vibration array 210 according to an embodiment of the present disclosure may further include a plate 216 disposed in the first protection member 213 or the second protection member 215.

The plate 216 may have the same shape as that of the first protection member 213 (or the second protection member 215) and may have a size which is greater than or equal to that of the first protection member 213 (or the second protection member 215). The plate 216 according to an embodiment of the present disclosure may include a metal material, and for example, may include one or more materials of stainless steel, aluminum (Al), a magnesium (Mg), a Mg alloy, a magnesium-lithium (Mg—Li) alloy, and an Al alloy, but embodiments are not limited thereto. The plate 216 may be disposed in the first protection member 213 (or the second protection member 215) and may reinforce a mass of the vibration array 210 to decrease a resonance frequency of the vibration array 210 based on an increase in mass, and thus, may increase a sound characteristic and a sound pressure level characteristic of the low-pitched sound band generated based on a vibration of the vibration array 210 and may enhance the flatness of a sound pressure level characteristic. For example, the flatness of a sound pressure level characteristic may be a magnitude of a deviation between a highest sound pressure level and a lowest sound pressure level.

The plate 216 according to an embodiment of the present disclosure may be disposed on a front surface (or a first surface) of the first protection member 213. The plate 216 may be disposed on the front surface of the first protection member 213 of the vibration array 210 by a coupling member (or a connection member). The plate 216 according to an embodiment of the present disclosure may be disposed between the display panel 100 and the vibration array 210. For example, the plate 216 may be disposed on the rear surface of the display panel 100 by the adhesive member 150.

According to another embodiment of the present disclosure, the plate 216 may be disposed on a rear surface (or a second surface) of the second protection member 215. The plate 216 may be disposed on the rear surface of the second protection member 215 of the vibration array 210 by a coupling member (or a connection member). The plate 216 according to another embodiment of the present disclosure may be disposed between the vibration array 210 and the supporting member 300.

Therefore, the vibration device 200 according to an embodiment of the present disclosure may include the vibration array 210 including the plurality of vibration modules 210A to 210D which are arranged or tiled at a certain interval so as to be implemented as a single vibrator without being independently driven, and thus, may be driven as a large-area vibrator based on a single vibration of the plurality of vibration modules 210A to 210D. Accordingly, a large area of the display panel 100 may vibrate, thereby increasing or enhancing a sound characteristic and a sound pressure level characteristic in the low-pitched sound band and a reproduction band of a sound generated based on a large-area vibration of the display panel 100.

Moreover, the vibration device 200 according to an embodiment of the present disclosure may further include the plate 216 disposed in the vibration array 210, and thus, a resonance frequency of the vibration array 210 may decrease by the plate 216. Accordingly, the vibration device 200 according to an embodiment of the present disclosure may increase a sound characteristic, a sound pressure level characteristic of the low-pitched sound band, and a flatness of a sound pressure level characteristic of a sound generated based on a vibration of the display panel 100 based on a vibration of the vibration array 210.

FIGS. 5A to 5F illustrate the piezoelectric layers of the vibration modules illustrated in FIG. 4.

With reference to FIGS. 3, 4, and 5A, a piezoelectric layer 211 of each of the plurality of vibration modules 210A to 210D arranged (or tiled) in the vibration array 210 according to an embodiment of the present disclosure may include a plurality of first portions 211a and a plurality of second portions 211b. For example, the plurality of first portions 211a and the plurality of second portions 211b may be alternately and repeatedly arranged in a second direction Y. Each of the plurality of first portions 211a may be disposed between two adjacent second portions 211b of the plurality of second portions 211b and may have a first width W1 parallel to the second direction Y and a length parallel to a first direction X. Each of the plurality of second portions 211b may have a second width W2 parallel to the second direction Y and may have a length parallel to the first direction X. The first width W1 may be the same as or different from the second width W2. For example, the first width W1 may be greater than the second width W2. For example, the first portion 211a and the second portion 211b may include a line shape or a stripe shape which has the same size or different sizes. Therefore, the piezoelectric layer 211 illustrated in FIG. 5A may include a 2-2 composite and thus may have a resonance frequency of 20 kHz or less, but embodiments are not limited thereto and a resonance frequency of the piezoelectric layer 211 may vary based on one or more of a shape, a length, and a thickness.

With reference to FIGS. 3, 4, and 5B, a piezoelectric layer 211 of each of the plurality of vibration modules 210A to 210D arranged (or tiled) in the vibration array 210 according to another embodiment of the present disclosure may include a plurality of first portions 211a and a plurality of second portions 211b, which are alternately and repeatedly arranged in a first direction X. Each of the plurality of first portions 211a may be disposed between two adjacent second portions 211b of the plurality of second portions 211b and may have a third width W3 parallel to the first direction X and a length parallel to a second direction Y. Each of the plurality of second portions 211b may have a fourth width W4 parallel to the first direction X and may have a length parallel to the second direction Y. The third width W3 may be the same as or different from the fourth width W4. For example, the third width W3 may be greater than the fourth width W4. For example, the first portion 211a and the second portion 211b may include a line shape or a stripe shape which has the same size or different sizes. Therefore, the piezoelectric layer 211 illustrated in FIG. 5B may include a 2-2 composite and thus may have a resonance frequency of 20 kHz or less, but embodiments are not limited thereto and a resonance frequency of the piezoelectric layer 211 may vary based on one or more of a shape, a length, and a thickness.

In the piezoelectric layer 211 illustrated in each of FIGS. 5A and 5B, each of the plurality of first portions 211a and each of the plurality of second portions 211b may be disposed (or arranged) in parallel on the same plane (or the same layer). Each of the plurality of second portions 211b may be configured to fill a gap between two adjacent first portions 211a, and thus, may be connected to or attached on an adjacent first portion 211a. For example, each of the plurality of second portions 211b may be connected to or attached on a side surface (or a lateral surface) of the adjacent first portion 211a. Accordingly, the piezoelectric layer 211 may be enlarged to have a desired size or length based on side coupling (or side connection) between the first portion 211a and the second portion 211b.

In the piezoelectric layer 211 illustrated in each of FIGS. 5A and 5B, a width (or a size) W2 and W4 of each of the plurality of second portions 211b may progressively decrease in a direction from a center portion to both peripheries (or both ends) of the piezoelectric layer 211 or the vibration device.

A second portion 211b, having a largest width (W2, W4) among the plurality of second portions 211b, may be located in a portion on which a highest stress may concentrate when the piezoelectric layer 211 or the vibration device is vibrating in a vertical direction Z (or a thickness direction). A second portion 211b, having a smallest width (W2, W4) among the plurality of second portions 211b, may be located in a portion where a relatively low stress may occur when the piezoelectric layer 211 or the vibration device is vibrating in the vertical direction Z. For example, the second portion 211b, having the largest width (W2, W4) among the plurality of second portions 211b, may be disposed in the center portion of the piezoelectric layer 211, and the second portion 211b, having the smallest width (W2, W4) among the plurality of second portions 211b may be disposed in each of the both edges or peripheries of the piezoelectric layer 211. Therefore, when the piezoelectric layer 211 or the vibration device is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the piezoelectric layer 211 illustrated in each of FIGS. 5A and 5B, each of the plurality of first portions 211a may have different sizes (or widths). For example, a size (or a width) of each of the plurality of first portions 211a may progressively decrease or increase in a direction from the center portion to the both peripheries (or both ends) of the piezoelectric layer 211 or the vibration device. For example, in the piezoelectric layer 211, a sound pressure level characteristic of a sound may be enhanced and a sound reproduction band may increase, based on various natural vibration frequencies according to a vibration of each of the plurality of first portions 211a having different sizes.

Figure 5C:
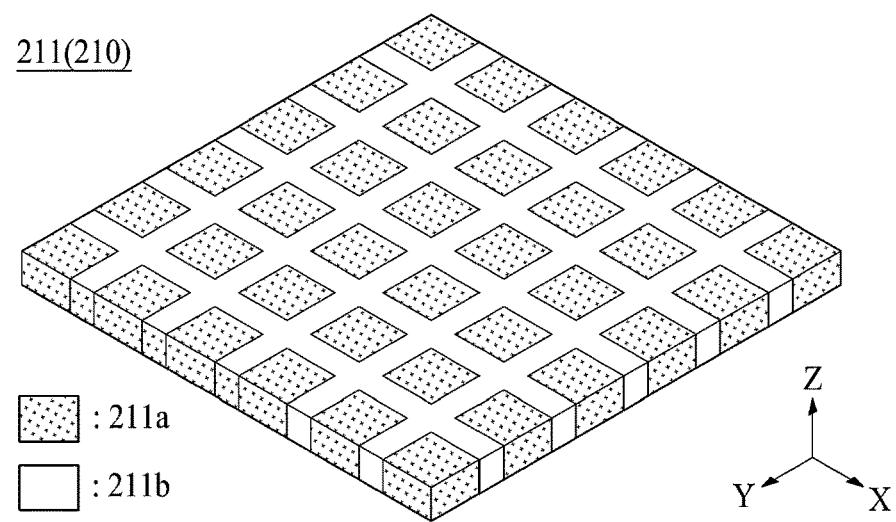

With reference to FIGS. 3, 4, and 5C, a piezoelectric layer 211 of each of the plurality of vibration modules 210A to 210D arranged (or tiled) in the vibration array 210 according to another embodiment of the present disclosure may include a plurality of first portions 211a, which are spaced apart from one another in a first direction X and a second direction Y, and a second portion 211b disposed between the plurality of first portions 211a. The plurality of first portions 211a may be disposed to be spaced apart from one another in the first direction X and the second direction Y. For example, each of the plurality of first portions 211a may have a rectangular shape having the same size and may be disposed in a lattice shape. The second portion 211b may be disposed between the plurality of first portions 211a in each of the first direction X and the second direction Y. The second portion 211b may be configured to fill a gap or a space between two adjacent first portions 211a or to surround each of the plurality of first portions 211a, and thus, may be connected to or attached on an adjacent first portion 211a. According to an embodiment of the present disclosure, a width of a second portion 211b disposed between two first portions 211a adjacent to each other in the first direction X may be the same as or different from that of the first portion 211a, and a width of a second portion 211b disposed between two first portions 211a adjacent to each other in the second direction Y may be the same as or different from that of the first portion 211a. Therefore, the piezoelectric layer 211 illustrated in FIG. 5C may include a 1-3 composite and thus may have a resonance frequency of 30 MHz or less, but embodiments are not limited thereto and a resonance frequency of the piezoelectric layer 211 may vary based on one or more of a shape, a length, and a thickness.

A composite connectivity of 1-3 is widely used since this connectivity can efficiently use the geometrical advantages of piezoelectric materials, offering highest electromechanical coupling factors. Therefore, in a 1-3 composite a piezoelectric active component or portion is surrounded by a grid providing a passive phase portion or passive portion. In the present case the 1-3 composite and 1-3 vibration mode is illustrated in the second region of FIGS. 5C and 5D.

Figure 5D:
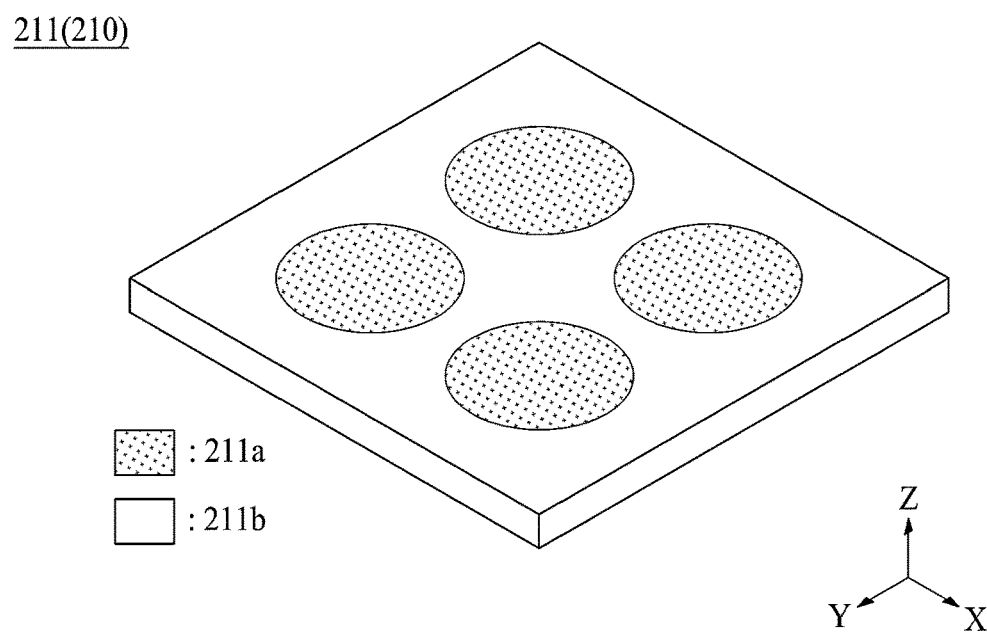

With reference to FIGS. 3, 4, and 5D, a piezoelectric layer 211 of each of the plurality of vibration modules 210A to 210D arranged (or tiled) in the vibration array 210 according to another embodiment of the present disclosure may include a plurality of first portions 211a, which are spaced apart from one another in a first direction X and a second direction Y, and a second portion 211b which surrounds each of the plurality of first portions 211a. Each of the plurality of first portions 211a may have a flat structure of a circular shape. For example, each of the plurality of first portions 211a may have a circular plate shape, but embodiments are not limited thereto and may have a dot shape including an oval shape, a polygonal shape, or a donut shape. The second portion 211b may be configured to surround each of the plurality of first portions 211a, and thus, may be connected to or attached on a side surface of each of the plurality of first portions 211a. The plurality of first portions 211a and the second portion 211b may be disposed (or arranged) in parallel on the same plane (or the same layer). Therefore, the piezoelectric layer 211 illustrated in FIG. 5D may include a 1-3 composite and may be implemented as a circular vibration source (or vibrator), and thus, may be enhanced in vibration characteristic or sound output characteristic and may have a resonance frequency of 30 MHz or less. However, embodiments of the present disclosure are not limited thereto, and a resonance frequency of the piezoelectric layer 211 may vary based on one or more of a shape, a length, and a thickness of a piezoelectric layer.

Figure 5E:
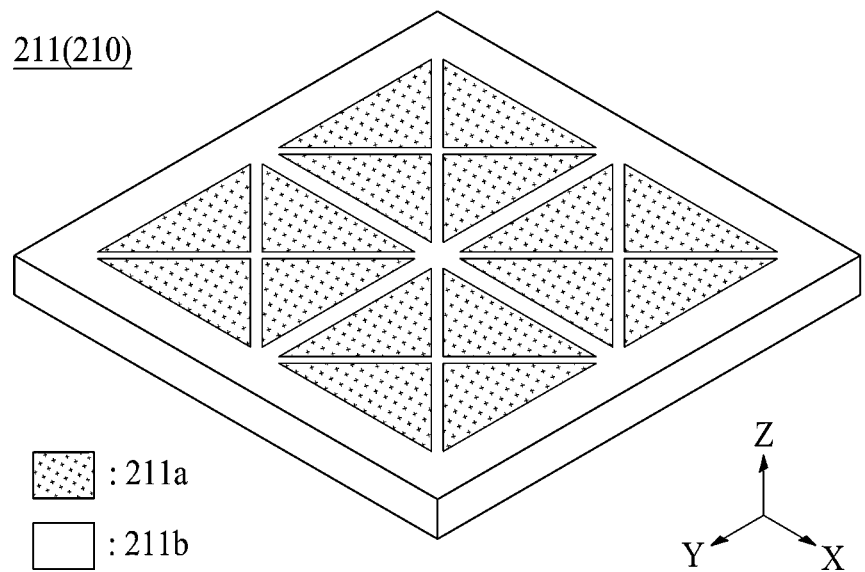

With reference to FIGS. 3, 4, and 5E, a piezoelectric layer 211 of each of the plurality of vibration modules 210A to 210D arranged (or tiled) in the vibration array 210 according to another embodiment of the present disclosure may include a plurality of first portions 211a, which are spaced apart from one another in a first direction X and a second direction Y, and a second portion 211b which surrounds each of the plurality of first portions 211a. Each of the plurality of first portions 211a may have a flat structure of a triangular shape. For example, each of the plurality of first portions 211a may have a triangular plate shape.

As another example, four adjacent first portions 211a among the plurality of first portions 211a may be adjacent to one another to form a tetragonal or quadrilateral shape (or a square shape). Vertices of the four adjacent first portions 211a forming a tetragonal shape may be adjacent to one another in a center portion (or a central portion) of the tetragonal shape. The second portion 211b may be configured to surround each of the plurality of first portions 211a, and thus, may be connected to or attached on a side surface (or a lateral surface) of each of the plurality of first portions 211a. The plurality of first portions 211a and the second portion 211b may be disposed (or arranged) in parallel on the same plane (or the same layer). Therefore, the piezoelectric layer 211 illustrated in FIG. 5E may include a 1-3 composite and thus may have a resonance frequency of 30 MHz or less, but embodiments are not limited thereto and a resonance frequency of the piezoelectric layer 211 may vary based on one or more of a shape, a length, and a thickness.

Figure 5F:
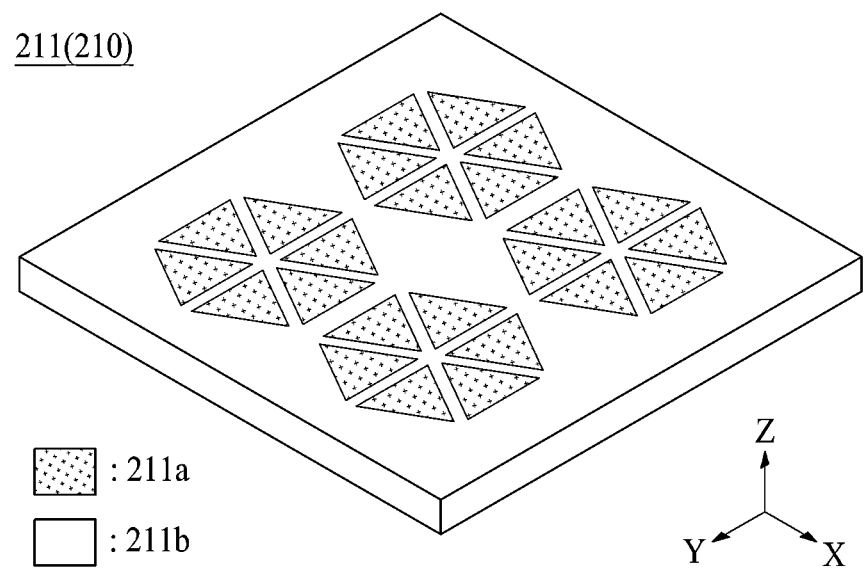

As another example, as illustrated in FIG. 5F, six adjacent first portions 211a among the plurality of first portions 211a may be adjacent to one another to form a hexagonal shape (or a regularly hexagonal shape). Vertices of the six adjacent first portions 211a forming a hexagonal shape may be adjacent to one another in a center portion (or a central portion) of the hexagonal shape. The second portion 211b may be configured to surround each of the plurality of first portions 211a, and thus, may be connected to or attached on a side surface (or a lateral surface) of each of the plurality of first portions 211a. The plurality of first portions 211a and the second portion 211b may be disposed (or arranged) in parallel on the same plane (or the same layer). Therefore, the piezoelectric layer 211 illustrated in FIG. 5F may include a 1-3 composite and may be implemented as a circular vibration source (or vibrator), and thus, may be enhanced in vibration characteristic or sound output characteristic and may have a resonance frequency of 30 MHz or less. However, embodiments of the present disclosure are not limited thereto, and a resonance frequency of the piezoelectric layer 211 may vary based on one or more of a shape, a length, and a thickness of a piezoelectric layer.

With reference to FIGS. 5E and 5F, 2N (where N is a natural number greater than or equal to 2) adjacent first portions 210 among the plurality of first portions 211a having the triangular shape may be disposed adjacent to one another to form a 2N-angular shape.

In FIGS. 5A to 5F, the plurality of first portions 211a according to an embodiment of the present disclosure may each be configured as an inorganic material portion. The inorganic material portion may include a piezoelectric material or an electroactive material. The piezoelectric material or the electroactive material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. As described above with reference to FIG. 4, a first surface of each of the plurality of first portions 211a may be electrically connected to the first electrode layer E1, and a second surface of each of the plurality of first portions 211a may be electrically connected to the second electrode layer E2.

In FIGS. 5A to 5F, the inorganic material portion included in each of the plurality of first portions 211a may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, the chemical formula "$ABO_3$" may include one of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

When the perovskite crystalline structure includes a center ion (for example, lead(II) titanate), a position of a titanium (Ti) ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal (e.g., quadrilateral), orthorhombic, or rhombohedral structure corresponding to an unsymmetric structure, and thus, a piezoelectric effect may be generated. In a tetragonal (e.g., quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

According to an embodiment of the present disclosure, the inorganic material portion included in each of the plurality of first portions 211a may include one or more materials of lead (Pb), zirconium (Zr), titanium (Ti), zinc (Zn), nickel (Ni), and niobium (Nb), but embodiments of the present disclosure are not limited thereto.

According to another embodiment of the present disclosure, the inorganic material portion included in each of the plurality of first portions 211a may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the inorganic material portion may include at least one or more of calcium titanate ($CaTiO_3$), $BaTiO_3$, and $SrTiO_3$, each without Pb, but embodiments of the present disclosure are not limited thereto.

According to another embodiment of the present disclosure, an inorganic material portion included in each of the plurality of first portions 211a may have a piezoelectric deformation coefficient "$d_{33}$" of 1,000 pC/N or more in a thickness direction Z. The inorganic material portion may be applied to a display panel having a large size and may need to have a high piezoelectric deformation coefficient "$d_{33}$", for having a sufficient vibration characteristic or piezoelectric characteristic. For example, the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the inorganic material portion, and for example, may increase the piezoelectric deformation coefficient "$d_{33}$" of the inorganic material portion. When the softener dopant material includes a monovalent element "+1", the inventors have confirmed that a piezoelectric characteristic and a dielectric characteristic are reduced. For example, when the softener dopant material includes kalium (K) and rubidium (Rb), the inventors have confirmed that a piezoelectric characteristic and a dielectric characteristic are reduced. Therefore, by performing various experiments, the inventors have recognized that the softener dopant material should include a dyad element "+2" to a triad element "+3", for enhancing a piezoelectric characteristic and a dielectric characteristic. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions ($Sr^{2+}$, $Ba^{2+}$, $La^{2+}$, $Nd^{3+}$, $Ca^{2+}$, $Y^{3+}$, $Er^{3+}$, $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is less than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration device having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a lead magnesium niobate (PMN)-based material or a lead nickel niobate (PNN)-based material, but is not limited thereto. The PMN-based material may include Pb, Mg, and Nb, and for example, may include Pb(Ni, Nb)$O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is less than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the inorganic material portion provided in each of the plurality of first portions 211 may further include a donor material doped into B site (ZrTi) of the PZT-based material ($PbZrTiO_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The inorganic material portion provided in each of the plurality of first portions 211 according to an embodiment of the present disclosure may be expressed as the following Formula 1.

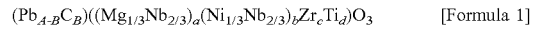

$(Pb_{A-B}C_B)((Mg_{1/3}Nb_{2/3})_a(Ni_{1/3}Nb_{2/3})_bZr_cTi_d)O_3$ [Formula 1]

Here, C may be one of Ca, Sr, and Ba. Also, a+b+c+d=1, 0.02≤B≤0.20, 0.80≤A−B≤0.98, 0.05≤a≤0.25, 0.05≤b≤0.25, 0.10≤c≤0.50, and 0.10≤d≤0.50.

The inorganic material portion provided in each of the plurality of first portions 211 according to an embodiment of the present disclosure may have a piezoelectric deformation coefficient "$d_{33}$" of 1,000 pC/N or more in a thickness direction Z, thereby implementing a vibration device having an enhanced vibration characteristic. pC/N may be a unit of piezoelectric effect, which represents the amount of electricity generated on the surface of a piezoelectric material when a force of 1 Newton is applied. For example, a vibration device having an enhanced vibration characteristic may be implemented in a large-area display apparatus.

In FIGS. 5A to 5F, the second portion 211b may be disposed between the plurality of first portions 211a, or may be disposed to surround each of the plurality of first portions 211a. Therefore, in the piezoelectric layer 211 of the vibration array 210 or the vibration device, vibration energy based on a link in a unit lattice of each first portion 211a may increase by a corresponding second portion 211b. Thus, a vibration may increase, and a piezoelectric characteristic and flexibility may be secured. For example, the second portion 211b may include at least one of an epoxy-based polymer, an acryl-based polymer, and a silicone-based polymer, but embodiments are not limited thereto.

The second portion 211b according to an embodiment of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the piezoelectric layer 211 of the vibration array 210 or the vibration device, and may provide flexibility to the piezoelectric layer 211 of the vibration array 210 or the vibration device.

The second portion 211b according to an embodiment of the present disclosure may have modulus and viscoelasticity that are lower than those of each first portion 211a, and thus, the second portion 211b may enhance the reliability of each first portion 211a vulnerable to an impact due to a fragile characteristic. For example, the second portion 211b may include a material having a loss coefficient of about 0.01 to about 1.0 and modulus of about 0.1 [GPa] to about 10 [GPa].

The organic material portion included in the second portion 211b may include one or more of an organic material, an organic polymer, an organic piezoelectric material, and an organic non-piezoelectric material that has a flexible characteristic in comparison with the inorganic material portion of the first portions 211a. For example, the second portion 211b may be referred to as an adhesive portion, an elastic portion, a bending portion, a damping portion, or a flexible portion each having flexibility, but embodiments of the present disclosure are not limited thereto.

Therefore, the plurality of first portions 211a and the second portion 211b may be disposed on (or connected to) the same plane, and thus, the piezoelectric layer 211 of the vibration array 210 according to various embodiments of the present disclosure may have a single thin film-type. For example, the piezoelectric layer 211 may be vibrated in a vertical direction (or a thickness direction) by the first portion 211a having a vibration characteristic and may be bent in a curved shape by the second portion 211b having flexibility. Also, in the piezoelectric layer 211 of the vibration array 210 according to various embodiments of the present disclosure, a size of the first portion 211a and a size of the second portion 211b may be set based on a piezoelectric characteristic and flexibility needed for the piezoelectric layer 211. For example, in a case where the piezoelectric layer 211 needs a piezoelectric characteristic rather than flexibility, a size of the first portion 211a may be set to be greater than that of the second portion 211b. As another example, in a case where the piezoelectric layer 211 needs flexibility rather than a piezoelectric characteristic, a size of the second portion 211b may be set to be greater than that of the first portion 211a. For example, the size of the second portion 211b and the size of the first portion 211a may be one or more of a width, a length, and a thickness. Accordingly, a size of the piezoelectric layer 211 may be adjusted based on a characteristic needed therefor, and thus, the piezoelectric layer 211 may be easy to design.

One or more of the piezoelectric layers 211 illustrated in FIGS. 5A to 5F may be one or more piezoelectric layers 211 of the plurality of vibration modules 210A to 210D illustrated in FIG. 3. For example, each of the plurality of vibration modules 210A to 210D may be implemented with one or more of the piezoelectric layers 211 described above with reference to FIGS. 5A to 5F, based on a desired characteristic of a sound generated based on a vibration of the vibration device 200.

According to an embodiment of the present disclosure, each of the plurality of vibration modules 210A to 210D may include one or more of the piezoelectric layers 211 described above with reference to FIGS. 5A to 5F, or may include different piezoelectric layers 211.

According to an embodiment of the present disclosure, some and the other vibration modules of the plurality of vibration modules 210A to 210D may include different piezoelectric layers 211 among the piezoelectric layers 211 described above with reference to FIGS. 5A to 5F. For example, in the first to fourth vibration modules 210A to 210D illustrated in FIG. 3, each of the first and second vibration modules 210A and 210B may include one or more of the piezoelectric layers 211 described above with reference to FIGS. 5A to 5F, and each of the third and fourth vibration modules 210C and 210D may include the piezoelectric layer 211, which differs from the piezoelectric layer 211 of the first and second vibration modules 210A and 210B, among the piezoelectric layers 211 described above with reference to FIGS. 5A to 5F. For example, in the first to fourth vibration modules 210A to 210D illustrated in FIG. 3, the first and fourth vibration modules 210A and 210D disposed in a first diagonal direction may include one or more of the piezoelectric layers 211 described above with reference to FIGS. 5A to 5F, and the second and third vibration modules 210B and 210C disposed in a second diagonal direction may include the piezoelectric layer 211, which differs from the piezoelectric layers 211 of the first and fourth vibration modules 210A and 210D disposed in the first diagonal direction, among the piezoelectric layers 211 described above with reference to FIGS. 5A to 5F.

Figure 6:
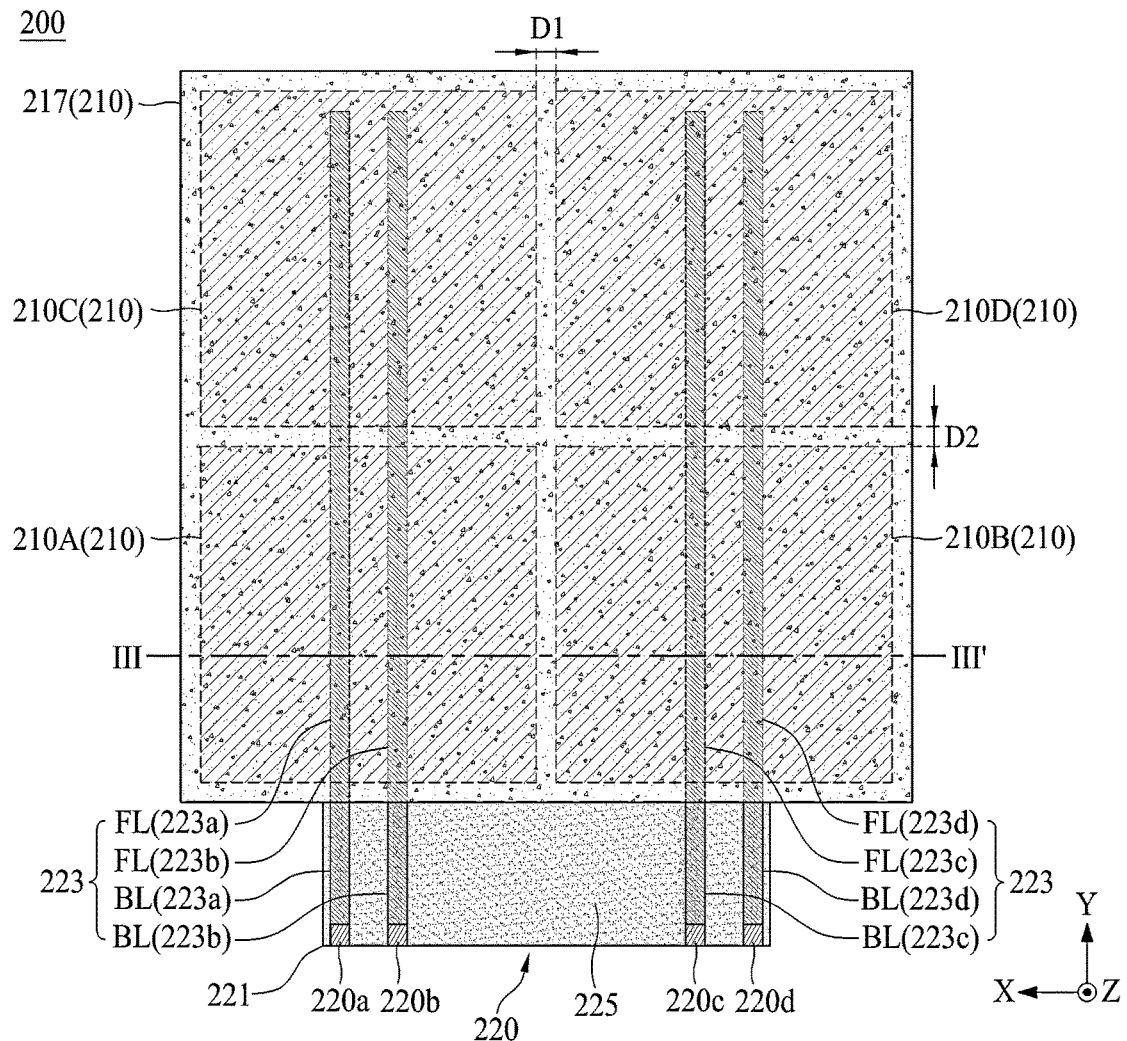
FIG. 6 illustrates a vibration device according to another embodiment of the present disclosure.
Figure 7:
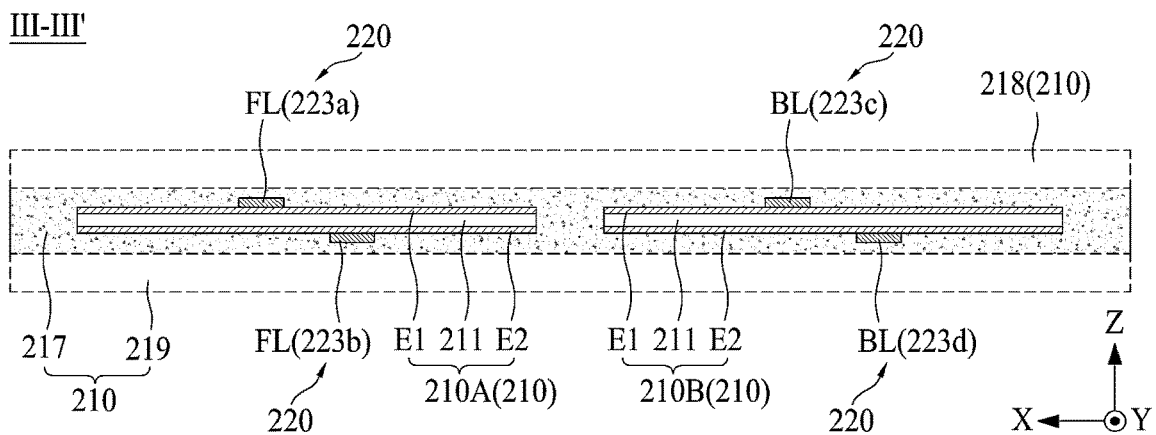
FIG. 7 is a cross-sectional view taken along line III-III' illustrated in FIG. 6.

FIG. 6 illustrates a vibration device 200 according to another embodiment of the present disclosure. FIG. 7 is a cross-sectional view taken along line III-III' illustrated in FIG. 6.

With reference to FIGS. 6 and 7 in conjunction with FIG. 2, the vibration device 200 according to another embodiment of the present disclosure may include a vibration array 210 and a flexible cable 220. For example, the vibration device 200 may be implemented so that the vibration array 210 and the flexible cable 220 are provided as one body.

The vibration array 210 according to an embodiment of the present disclosure may include a plurality of vibration modules (or first to fourth vibration modules) 210A to 210D which are divisionally or separately disposed in each of a first direction X and a second direction Y. For example, the plurality of vibration modules (or the first to fourth vibration modules) 210A to 210D may be disposed spaced apart from one another by a certain interval in each of the first direction X and the second direction Y. For example, the plurality of vibration modules (or the first to fourth vibration modules) 210A to 210D may be electrically disconnected (or isolated) from one another and may be disposed in each of the first direction X and the second direction Y. Each of the plurality of vibration modules 210A to 210D may be substantially the same as each of the plurality of vibration modules 210A to 210D described above with reference to FIGS. 3 and 4, and thus, their repetitive descriptions are omitted. Each of the plurality of vibration modules 210A to 210D may include a piezoelectric layer 211, a first electrode layer E1, and a second electrode layer E2. The piezoelectric layer 211 may be substantially the same as one or more of the piezoelectric layers 211 described above with reference to FIGS. 5A to 5F, and thus, its repetitive description is omitted. Each of the plurality of vibration modules 210A to 210D may include one or more of the piezoelectric layers 211 described above with reference to FIGS. 5A to 5F, or may include different piezoelectric layers 211.

The flexible cable 220 may be electrically and directly connected to the first and second electrode layers E1 and E2 of each of the plurality of vibration modules 210A to 210D at one side of the vibration array 210, and thus, may be integrated into the vibration array 210. For example, the flexible cable 220 and the vibration array 210 may be integrated as one body.

The flexible cable 220 according to an embodiment of the present disclosure may include a base member 221, a conductor layer 223 including a plurality of conductive lines 223a to 223d, and an insulation layer 225.

The base member 221 may include a transparent or opaque plastic material. For example, the base member 221 may be implemented with one or more of synthetic resins including a fluorine resin, a polyimide resin, a polyurethane resin, a polyester resin, a polyethylene resin, and a polypropylene resin, but embodiments are not limited thereto. The base member 221 may be a base film or a base insulation film.

The base member 221 according to an embodiment of the present disclosure may include a plurality of terminal portions (or first to fourth terminal portions) 220a to 220d. The plurality of terminal portions 220a to 220d may each be an input terminal portion and may include a plurality of terminals disposed at one periphery portion (or an edge portion) of the base member 221. The plurality of terminals may be arranged at a certain interval (or distance) at the one periphery portion of the base member 221.

The conductor layer 223 may be disposed on the base member 221. For example, the conductor layer 223 may include a conductive material including copper (Cu), aluminum (Al), silver (Ag), or an alloy material of Cu and Ag, but embodiments are not limited thereto.

The conductor layer 223 according to an embodiment of the present disclosure may include a plurality of conductive lines (or first to fourth conductive lines) 223a to 223d. Each of the plurality of conductive lines 223a to 223d may be patterned from a conductive material layer disposed on the base member 221.

The plurality of conductive lines 223a to 223d according to an embodiment of the present disclosure may be disposed on one surface (or an upper surface) of the base member 221. For example, the plurality of conductive lines 223a to 223d may be disposed on the one surface (or the upper surface) of the base member 221 so as to be spaced apart from one another in a first direction X and parallel to a second direction Y. Each of the plurality of conductive lines 223a to 223d may extend along the second direction Y to have a certain width in the first direction X.

With respect to the second direction Y, a length of each of the plurality of conductive lines 223a to 223d may be longer than that of the base member 221. For example, each of the plurality of conductive lines 223a to 223d may pass by a side surface of the base member 221 and may protrude or extend to overlap the vibration array 210, and thus, may have a length which is longer than a length of the base member 221. For example, a protrusion length (or an extension length) of each of the plurality of conductive lines 223a to 223d may be twice or more than a length of each of the plurality of conductive lines 223a to 223d disposed in the base member 221.

Each of the plurality of conductive lines 223a to 223d according to an embodiment of the present disclosure may include a first line (or a base line) BL disposed on the base member 221 and a second line (a finger line or an extension line) FL which extends or protrudes from a side surface of the base member 221. Therefore, each finger line FL has a certain width and may be designated as flexible cable to provide sufficient contact to the first and the second electrodes E1 and E2.

The second line FL of each of the plurality of conductive lines 223a to 223d may not be fixed (or supported) to the base member 221, and thus, may have flexibility which is higher than that of the first line BL fixed to the base member 221. For example, the second line FL of each of the plurality of conductive lines 223a to 223d may be supported by the base member 221 in a process of manufacturing the flexible cable. Also, as a portion of the base member 221 supporting the second line FL of each of the plurality of conductive lines 223a to 223d is removed by a process of removing a film, the second line FL may not be fixed to the base member 221 and may protrude or extend from the base member 221. Therefore, the second line FL of each of the plurality of conductive lines 223a to 223d may have flexibility. For example, the second line FL of each of the plurality of conductive lines 223a to 223d may have independent flexibility.

The second line FL of each of the plurality of conductive lines 223a to 223d may be an output terminal portion. For example, the second line FL of each of the plurality of conductive lines 223a to 223d may be electrically and directly connected to the first and second electrode layers E1 and E2 of each of the plurality of vibration modules 210A to 210D, and thus, may be integrated into the vibration array 210.

The insulation layer 225 may be disposed on the base member 221 and may cover the conductor layer 223. The insulation layer 225 may expose one side of each of the plurality of conductive lines 223a to 223d at the terminal portions 220a to 220d. The insulation layer 225 may be disposed at a portion other than the terminal portions 220a to 220d disposed on the base member 221, and thus, may surround a portion other than one side of each of the plurality of conductive lines 223a to 223d disposed on the base member 221. For example, the insulation layer 225 may surround the first line BL of each of the plurality of conductive lines 223a to 223d disposed on the base member 221.

The insulation layer 225 according to an embodiment of the present disclosure may include a transparent or opaque plastic material. For example, the insulation layer 225 may be implemented with one material among synthetic resins including a fluorine resin, a polyimide resin, a polyurethane resin, a polyester resin, a polyethylene resin, and a polypropylene resin, but embodiments are not limited thereto.

The flexible cable 220 according to an embodiment of the present disclosure may further include a pad part disposed in each of the terminal portions 220a to 220d of the base member 221. The pad part may include an electrode pad disposed in each of the terminal portions 220a to 220d. The electrode pad may include at least one of gold (Au) and silver (Ag). For example, the electrode pad may be a plating layer, but embodiments are not limited thereto.

In the flexible cable 220 according to an embodiment of the present disclosure, the base member 221, the first line BL of each of the plurality of conductive lines 223a to 223d, and the insulation layer 225 may implement a cable body portion, and the second line FL of each of the plurality of conductive lines 223a to 223d may implement a finger portion which protrudes from a cable body portion.

Therefore, the flexible cable 220 may be supplied with or receive a driving power through the terminal portions 220a to 220d respectively corresponding to sides of the plurality of conductive lines 223a to 223d and may output the driving power to the first and second electrode layers E1 and E2 of the vibration array 210 through the second line FL of each of the plurality of conductive lines 223a to 223d.

According to an embodiment of the present disclosure, some of the second lines FL of the plurality of conductive lines 223a to 223d may be bent from one side of the vibration array 210 toward an upper surface of the vibration array 210 and may be electrically connected to the first electrode layer E1 of each of the plurality of vibration modules 210A to 240D, and thus, may be integrated into the vibration array 210. The other second lines FL among the second lines FL of the plurality of conductive lines 223a to 223d may be bent from the one side of the vibration array 210 toward a lower surface of the vibration array 210 and may be electrically connected to the second electrode layer E2 of each of the plurality of vibration modules 210A to 240D, and thus, may be integrated into the vibration array 210. For example, some of the second lines FL of the plurality of conductive lines 223a to 223d may be electrically and directly connected to the first electrode layer E1 of each of the plurality of vibration modules 210A to 240D, and thus, may be integrated into the vibration array 210. For example, the other second lines FL of the plurality of conductive lines 223a to 223d may be electrically and directly connected to the second electrode layer E2 of each of the plurality of vibration modules 210A to 240D, and thus, may be integrated into the vibration array 210.

For example, the first to fourth conductive lines 223a to 223d may be grouped into first and second electrode groups. The first electrode group may include the first and second conductive lines 223a and 223b. The second electrode group may include the third and fourth conductive lines 223c and 223d.

In the first electrode group, the second line FL of the first conductive line 223a may be bent from the one side of the vibration array 210 toward the first electrode layer E1 of each of the first and third vibration modules 210A and 210C and may be electrically connected to the first electrode layer E1 of each of the first and third vibration modules 210A and 210C in the second direction Y. Also, the second line FL of the second conductive line 223b may be bent from the one side of the vibration array 210 toward the second electrode layer E2 of each of the first and third vibration modules 210A and 210C and may be electrically connected to the second electrode layer E2 of each of the first and third vibration modules 210A and 210C in the second direction Y.

In the second electrode group, the second line FL of the third conductive line 223c may be bent from the one side of the vibration array 210 toward the first electrode layer E1 of each of the second and fourth vibration modules 210B and 210D and may be electrically connected to the first electrode layer E1 of each of the second and fourth vibration modules 210B and 210D in the second direction Y. Also, the second line FL of the fourth conductive line 223d may be bent from the one side of the vibration array 210 toward the second electrode layer E2 of each of the second and fourth vibration modules 210B and 210D and may be electrically connected to the second electrode layer E2 of each of the second and fourth vibration modules 210B and 210D in the second direction Y.

The vibration device 200 or the vibration array 210 according to another embodiment of the present disclosure may further include a cover member 217.

The cover member 217 may be implemented at an outermost portion of the vibration array 210. For example, the cover member 217 may surround all of the plurality of vibration modules 210A to 210D. The cover member 217 may surround the plurality of vibration modules 210A to 210D, and thus, the flexible cable 220 may be integrated into the vibration array 210 and the plurality of vibration modules 210A to 210D may be implemented as a single body type. For example, the plurality of vibration modules 210A to 210D may be buried or tiled into the cover member 217 to have certain intervals D1 and D2, and thus, one large-area single vibrator may be configured by the cover member 217. Therefore, the plurality of vibration modules 210A to 210D may be implemented as one vibration device (or a single vibration device) which is not independently driven but is driven as one complete single body type. Therefore, the vibration array 210 may have a large area which is enlarged by tiling of the plurality of vibration modules 210A to 210D having a relatively small size. Accordingly, the vibration array 210 may be implemented as a large-area vibration device having one single vibrator, and thus, may be applied to a large-area display apparatus as one single vibrator.

The cover member 217 according to an embodiment of the present disclosure may be implemented to surround the plurality of vibration modules 210A to 210D electrically connected to the flexible cable 220. For example, the cover member 217 may be implemented to surround all of the plurality of vibration modules 210A to 210D electrically connected to the flexible cable 220. The cover member 217 may surround each of the plurality of vibration modules 210A to 210D in a state where the electrode layers E1 and E2 of each of the plurality of vibration modules 210A to 210D electrically contact the second line FL implemented in the flexible cable 220 corresponding thereto, and thus, the second line FL implemented in the flexible cable 220 may be integrated into the vibration array 210. For example, the cover member 217 may be disposed on a rear surface of the display panel 100 by the adhesive member 150.

The cover member 217 according to an embodiment of the present disclosure may include an electric insulating material which has adhesiveness and is capable of compression and decompression. For example, the cover member 217 may include an epoxy resin, an acryl resin, a silicone resin, or a urethane resin, but embodiments are not limited thereto.

The vibration device 200 or the vibration array 210 according to another embodiment of the present disclosure may further include a first protection member 218 and a second protection member 219.

The first protection member 218 may have the same shape as that of the cover member 217 and may have a size which is greater than or equal to that of the cover member 217. The first protection member 218 may be disposed on a first surface of the cover member 217. The first protection member 218 may be attached or disposed on the first surface of the cover member 217, thereby protecting the first surface of the cover member 217. The first protection member 218 according to an embodiment of the present disclosure may be attached or disposed on the first surface of the cover member 217 in a process of curing the cover member 217, but embodiments are not limited thereto. For example, the first protection member 218 may be attached or disposed on the first surface of the cover member 217 by a separate adhesive layer.

The second protection member 219 may have the same shape as that of the cover member 217 and may have a size which is greater than or equal to that of the cover member 217. For example, the second protection member 219 may have the same size or different size as the first protection member 218. The second protection member 219 may be disposed on a second surface of the cover member 217 opposite to the first surface of the cover member 217. The second protection member 219 may be attached or disposed on the second surface of the cover member 217, thereby protecting the second surface of the cover member 217. The second protection member 219 according to an embodiment of the present disclosure may be attached or disposed on the second surface of the cover member 217 in a process of curing the cover member 217, but embodiments are not limited thereto. For example, the second protection member 219 may be attached or disposed on the second surface of the cover member 217 by a separate adhesive layer.

Each of the first and second protection members 218 and 219 according to an embodiment of the present disclosure may include a plastic material. For example, each of the first protection member 218 and the second protection member 219 may be a polyimide (PI) film or a polyethyleneterephthalate (PET) film, but embodiments are not limited thereto.

As another example, one of the first and second protection members 218 and 219 may include a metal material and the other may include a plastic material.

The protection members 218 and 219 including a metal material among the first and second protection members 218 and 219 may reinforce a mass of the vibration array 210 to decrease a resonance frequency of the vibration array 210 based on the increase in mass, and thus, may increase a sound characteristic and a sound pressure level characteristic of a low-pitched sound band generated based on a vibration of the vibration array 210, thereby enhancing flatness of a sound pressure level characteristic. For example, the flatness of a sound pressure level characteristic may be a magnitude of a deviation between a highest sound pressure level and a lowest sound pressure level. For example, the protection members 218 and 219 including a metal material may include one or more materials of stainless steel, aluminum (Al), a magnesium (Mg), a Mg alloy, a magnesium-lithium (Mg—Li) alloy, and an Al alloy, but embodiments are not limited thereto.

According to an embodiment of the present disclosure, when the first protection member 218 includes a metal material, the first protection member 218 including a metal material may be disposed on the rear surface of the display panel 100 by the adhesive member 150, and the second protection member 219 may include a plastic material and may protect a second surface of the vibration array 210.

According to an embodiment of the present disclosure, when the second protection member 219 includes a metal material, the first protection member 218 may include a plastic material and may be disposed on the rear surface of the display panel 100 by the adhesive member 150, and the second protection member 219 including a metal material may be implemented to have a size which is relatively greater than that of the cover member 217 and may be disposed on the second surface of the vibration array 210.

According to an embodiment of the present disclosure, when one of the first and second protection members 218 and 219 includes a metal material, the other protection member may be omitted (or removed). For example, when the first protection member 218 includes a metal material, the first protection member 218 including a metal material may be disposed on the rear surface of the display panel 100 by the adhesive member 150, and the second protection member 219 may be omitted. For example, when the second protection member 219 includes a metal material, the second protection member 219 including a metal material may be coupled to the second surface of the vibration array 210, and the first protection member 218 may be omitted.

Therefore, the vibration device 200 according to another embodiment of the present disclosure may have the same effect as that of the vibration device 200 described above with reference to FIGS. 3 and 4 and may have a large area enlarged by the plurality of vibration modules 210A to 210D which are buried or tiled into the cover member 217 and have a relatively small size, and thus, may have a structure which is advantage or easy to implement a large area. Also, as the flexible cable 220 and the vibration array 210 are provided as one body, the vibration device 200 according to another embodiment of the present disclosure may not need a soldering process between the flexible cable 220 and the vibration array 210, and thus, a structure of a vibration device and a process of manufacturing a vibration device may be simplified. Also, a driving power may be supplied to each of the plurality of vibration modules 210A to 210D through the flexible cable 220, thereby complementing an electrical characteristic of each of the first electrode layer E1 and the second electrode layer E2 disposed in each of the plurality of vibration modules 210A to 210D.

Figure 8:
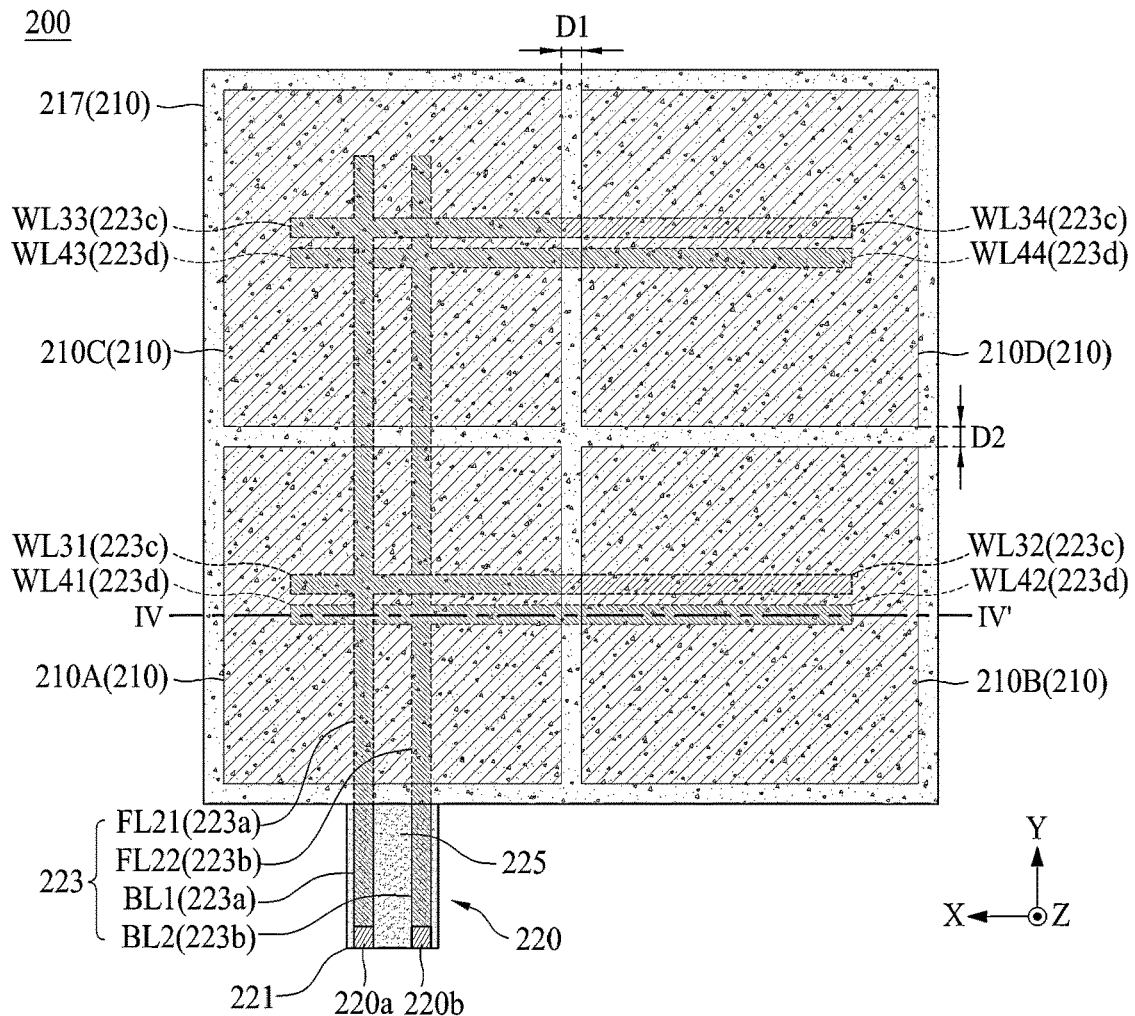
FIG. 8 illustrates a vibration device according to another embodiment of the present disclosure.
Figure 9:
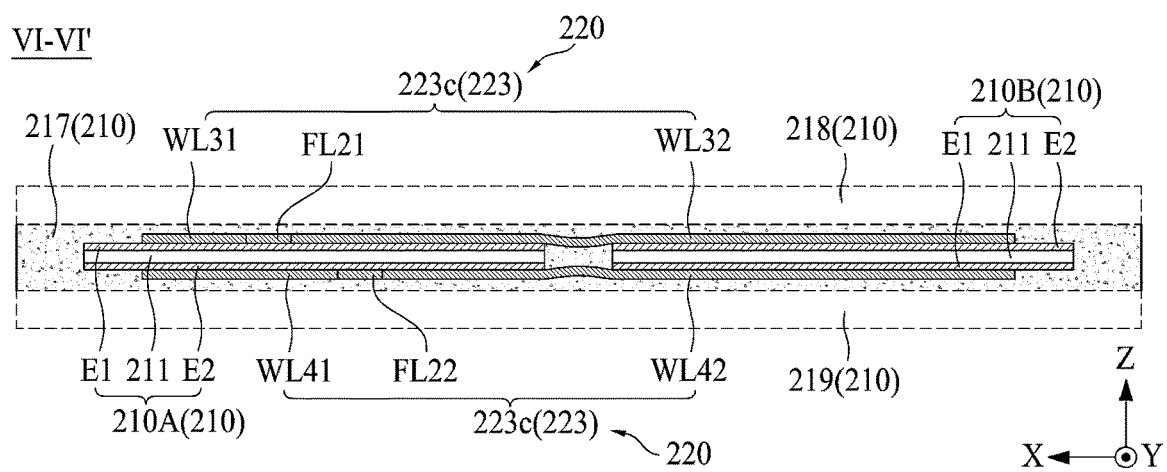
FIG. 9 is a cross-sectional view taken along line IV-IV' illustrated in FIG. 8.

FIG. 8 illustrates a vibration device 200 according to another embodiment of the present disclosure. FIG. 9 is a cross-sectional view taken along line IV-IV' illustrated in FIG. 8 and illustrates an embodiment where a structure of the flexible cable illustrated in FIG. 6 is modified. Hereinafter, therefore, repetitive descriptions of elements other than a flexible cable and elements relevant thereto are omitted or will be briefly given.

With reference to FIGS. 8 and 9, in the vibration device 200 or a vibration array 210 according to another embodiment of the present disclosure, a flexible cable 220 may include a base member 221, a conductor layer 223 including first and second conductive lines 223a and 223b, and an insulation layer 225.

Except for that the base member 221 has a relatively small size, the base member 221 may be substantially the same as the base member 221 described above with reference to FIG. 6, and thus, its repetitive description is omitted.

Each of the first and second conductive lines 223a and 223b may include first lines (or base lines) BL1 and BL2 disposed on the base member 221, second lines (finger lines or extension lines) FL21 and FL22 which pass by a side surface of the base member 221 from the first lines BL1 and BL2 in a second direction Y and extend to the vibration array 210, and third and fourth lines (or wing lines) 223c and 223d which protrude from the second lines FL21 and FL22 in parallel with the first direction X. In the flexible cable 220, elements other than at least one third line 223c and fourth line 223d are substantially the same as the first and second conductive lines 223a and 223b described above with reference to FIG. 6, and thus, their repetitive descriptions are omitted.

The second lines FL21 and FL22 of each of the first and second conductive lines 223a and 223b may be electrically connected to vibration modules 210A and 210C arranged in the second direction Y among a plurality of vibration modules 210A to 210D tiled in the vibration array 210. For example, the second lines FL21 and FL22 of each of the first and second conductive lines 223a and 223b may be electrically connected to the vibration modules 210A and 210C.

The second line (or a 2-1$^{th}$ line) FL21 of the first conductive line 223a according to an embodiment of the present disclosure may be disposed in the second direction Y and may be electrically connected to first surfaces of vibration modules 210A and 210C arranged in the second direction Y among the plurality of vibration modules 210A to 210D. For example, the 2-1$^{th}$ line FL21 may be bent from one side of a first vibration module 210A toward a first electrode layer E1 of each of the first and third vibration modules 210A and 210C and may be electrically connected to the first electrode layer E1 of each of the first and third vibration modules 210A and 210C in the second direction Y.

The second line (or a 2-2$^{th}$ line) FL22 of the second conductive line 223b according to an embodiment of the present disclosure may be disposed in the second direction Y and may be electrically connected to second surfaces of vibration modules 210A and 210C arranged in the second direction Y among the plurality of vibration modules 210A to 210D. For example, the 2-2$^{th}$ line FL22 may be bent from the one side of the first vibration module 210A toward a second electrode layer E2 of each of the first and third vibration modules 210A and 210C and may be electrically connected to the second electrode layer E2 of each of the first and third vibration modules 210A and 210C in the second direction Y.

The third line (or a first wing line) 223c may extend from the 2-1$^{th}$ line FL21 in the first direction X and may be electrically connected to a first surface of each of the plurality of vibration modules 210A to 210D. For example, the third line 223c may extend from the 2-1$^{th}$ line FL21 in the first direction X and may be electrically connected to the first electrode layer E1 of each of the plurality of vibration modules 210A to 210D.

The third line (or a wing line) 223c according to an embodiment of the present disclosure may include at least one 3-1$^{th}$ line WL31, at least one 3-2$^{th}$ line WL32, at least one 3-3$^{th}$ line WL33, and at least one 3-4$^{th}$ line WL34. The at least one 3-1$^{th}$ line (or a wing line) WL31 may extend in the first direction X from a first sidewall of the 2-1$^{th}$ line FL21 disposed in the first vibration module 210A and may be electrically connected to the first vibration module 210A. The at least one 3-2$^{th}$ line (or a wing line) WL32 may extend in the first direction X from a second sidewall of the 2-1$^{th}$ line FL21 disposed in the first vibration module 210A and may be electrically connected to the first and second vibration modules 210A and 210B. The at least one 3-3$^{th}$ line (or a wing line) WL33 may extend in the first direction X from a third sidewall of the 2-1$^{th}$ line FL21 disposed in the third vibration module 210C and may be electrically connected to the third vibration module 210C. The at least one 3-4$^{th}$ line (or a wing line) WL34 may extend in the first direction X from a fourth sidewall of the 2-1$^{th}$ line FL21 disposed in the third vibration module 210C and may be electrically connected to the third and fourth vibration modules 210C and 210D.

The at least one 3-1$^{th}$ line WL31 may be electrically connected to the first electrode layer E1 of the first vibration module 210A, and the at least one 3-2$^{th}$ line WL32 may be electrically connected to the first electrode layer E1 of each of the first and second vibration modules 210A and 210B. The at least one 3-3$^{th}$ line WL33 may be electrically connected to the first electrode layer E1 of the third vibration module 210C, and the at least one 3-4$^{th}$ line WL34 may be electrically connected to the first electrode layer E1 of each of the third and fourth vibration modules 210C and 210D.

The fourth line (or a second wing line) 223d may extend from the 2-2$^{th}$ line FL22 in the first direction X and may be electrically connected to a second surface of each of the plurality of vibration modules 210A to 210D. For example, the fourth line 223d may extend from the 2-2$^{th}$ line FL22 in the first direction X and may be electrically connected to the second electrode layer E2 of each of the plurality of vibration modules 210A to 210D.

The fourth line (or a wing line) 223d according to an embodiment of the present disclosure may include at least one 4-1$^{th}$ line WL41, at least one 4-2$^{th}$ line WL42, at least one 4-3$^{th}$ line WL43, and at least one 4-4$^{th}$ line WL44. The at least one 4-1$^{th}$ line (or a wing line) WL41 may extend in the first direction X from a first sidewall of the 2-2$^{th}$ line FL22 disposed in the first vibration module 210A and may be electrically connected to the first vibration module 210A. The at least one 4-2$^{th}$ line (or a wing line) WL42 may extend in the first direction X from a second sidewall of the 2-2$^{th}$ line FL22 disposed in the first vibration module 210A and may be electrically connected to the first and second vibration modules 210A and 210B. The at least one 4-3$^{th}$ line (or a wing line) WL43 may extend in the first direction X from a third sidewall of the 2-2$^{th}$ line FL22 disposed in the third vibration module 210C and may be electrically connected to the third vibration module 210C. The at least one 4-4$^{th}$ line (or a wing line) WL44 may extend in the first direction X from a fourth sidewall of the 2-2$^{th}$ line FL22 disposed in the third vibration module 210C and may be electrically connected to the third and fourth vibration modules 210C and 210D.

The at least one 4-1$^{th}$ line WL41 may be electrically connected to the second electrode layer E2 of the first vibration module 210A, and the at least one 4-2$^{th}$ line WL42 may be electrically connected to the second electrode layer E2 of each of the first and second vibration modules 210A and 210B. The at least one 4-3$^{th}$ line WL43 may be electrically connected to the second electrode layer E2 of the third vibration module 210C, and the at least one 4-4$^{th}$ line WL44 may be electrically connected to the second electrode layer E2 of each of the third and fourth vibration modules 210C and 210D.

Therefore, in the vibration device 200 or the vibration array 210 according to another embodiment of the present disclosure, four vibration modules 210A to 210D may be simultaneously driven by a vibration signal which is supplied through the 2-1$^{th}$ and 2-2$^{th}$ lines FL21 and FL22 of each of the first and second conductive lines 223a and 223b and the third and fourth lines 223c and 223d disposed in one flexible cable 220. Accordingly, an electrical connection structure between the flexible cable 220 and the vibration array 210 for driving the four vibration modules 210A to 210D may be simplified. Also, in the vibration device 200 or the vibration array 210 according to another embodiment of the present disclosure, the number of terminals disposed in the one flexible cable 220 for driving the four vibration modules 210A to 210D may decrease.

Figure 10:
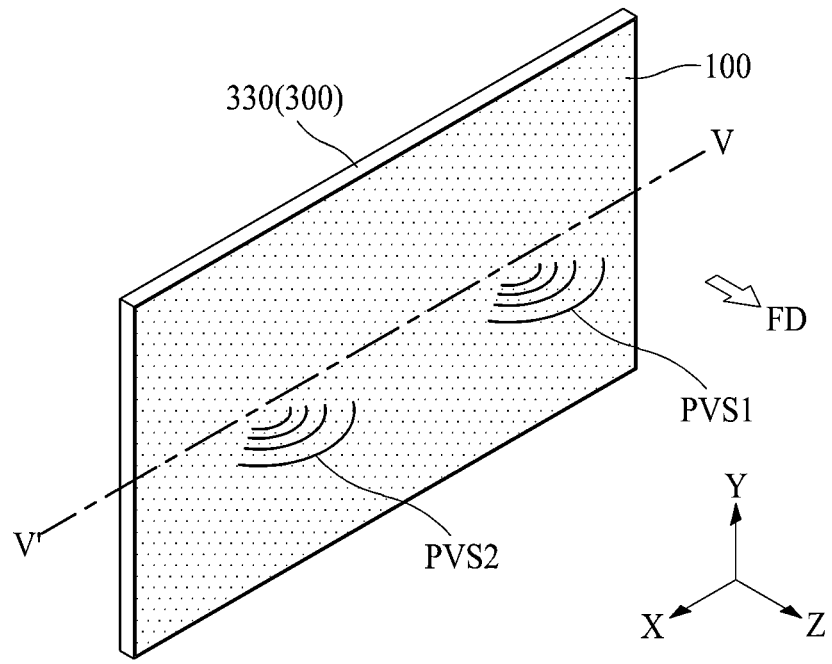
FIG. 10 illustrates a display apparatus according to another embodiment of the present disclosure.
Figure 11:
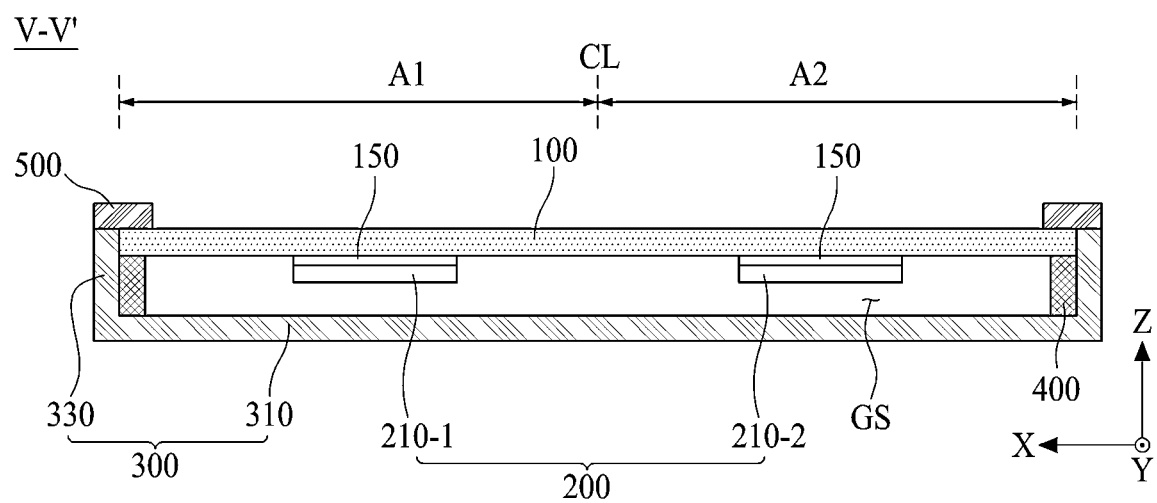
FIG. 11 is a cross-sectional view taken along line V-V' illustrated in FIG. 10.

FIG. 10 illustrates a display apparatus according to another embodiment of the present disclosure, FIG. 11 is a cross-sectional view taken along line V-V' illustrated in FIG. 10, and illustrates an embodiment where the vibration device in the display apparatus illustrated in FIG. 2 is modified. Hereinafter, therefore, repetitive descriptions of elements other than the vibration device and elements relevant thereto are omitted or will be briefly given.

With reference to FIGS. 10 and 11, in the display apparatus according to another embodiment of the present disclosure, a rear surface (or a back surface) of a display panel 100 may include a first region (or a first rear area) A1 and a second region (or a second rear area) A2. For example, the rear surface of the display panel 100 may be divided into the first region A1 and the second region A2. For example, in the rear surface of the display panel 100, the first region A1 may be a left rear region, and the second region A2 may be a right rear region. The terms "left" and "right" are used herein for convenience of explanation, and are interchangeable as should be understood by one of ordinary skill in the art. The first and second regions A1 and A2 may be a left-right symmetrical (or bilaterally symmetrical) with respect to a center line CL of the display panel 100 in a first direction X, but embodiments are not limited thereto. For example, each of the first and second regions A1 and A2 may overlap the display area of the display panel 100.

The vibration device 200 according to an embodiment of the present disclosure may include a first vibration array 210-1 and a second vibration array 210-2 disposed in the rear surface of the display panel 100.

The first vibration array 210-1 may be disposed in the first region A1 of the display panel 100. For example, the first vibration array 210-1 may be disposed close to a center or a periphery (or an edge) in the first region A1 of the display panel 100. The first vibration array 210-1 according to an embodiment of the present disclosure may directly vibrate the first region A1 of the display panel 100, and thus, may generate a first vibration sound PVS1 or a first haptic feedback in the first region A1 of the display panel 100. For example, the first vibration sound PVS1 may be a first panel vibration sound or a left sound. A size of the first vibration array 210-1 according to an embodiment of the present disclosure may have a size corresponding to half or less of the first region A1 or half or more of the first region A1 based on a characteristic of the first vibration sound PVS1 or a sound characteristic needed for a display apparatus.

The second vibration array 210-2 may be disposed in the second region A2 of the display panel 100. For example, the second vibration array 210-2 may be disposed close to a center or a periphery (or an edge) in the second region A2 of the display panel 100. The second vibration array 210-2 according to an embodiment of the present disclosure may directly vibrate the second region A2 of the display panel 100, and thus, may generate a second vibration sound PVS2 or a second haptic feedback in the second region A2 of the display panel 100. For example, the second vibration sound PVS2 may be a second panel vibration sound or a right sound. A size of the second vibration array 210-2 according to an embodiment of the present disclosure may have a size corresponding to half or less of the second region A2 or half or more of the second region A2 based on a characteristic of the second vibration sound PVS2 or a sound characteristic needed for a display apparatus. For example, the first vibration array 210-1 and the second vibration array 210-2 may have the same size or different sizes to each other based on a sound characteristic of left and right sounds and/or a stereo sound characteristic of the display apparatus and may be disposed in a left-right symmetrical structure or a left-right asymmetrical structure with respect to the center line CL of the display panel 100.

Each of the first vibration array 210-1 and the second vibration array 210-2 may include one or more among the vibration device 200 described above with reference to FIGS. 5A to 5F, and thus, their detailed descriptions are omitted.

The adhesive member 150 according to an embodiment of the present disclosure may be between each of the first vibration array 210-1 and the second vibration array 210-2 and the rear surface of the display panel 100. For example, each of the first vibration array 210-1 and the second vibration array 210-2 may be disposed (or connected) on the rear surface of the display panel 100 by the adhesive member 150. The adhesive member 150 may be substantially the same as the adhesive member 150 described above with reference to FIG. 2, and thus, its repetitive description is omitted.

The display apparatus according to another embodiment of the present disclosure may output, through the first vibration array 210-1 and the second vibration array 210-2, a left sound PVS1 and a right sound PVS2 to a forward region FD in front of the display panel 100 to provide a stereo sound to a user.

Figure 12:
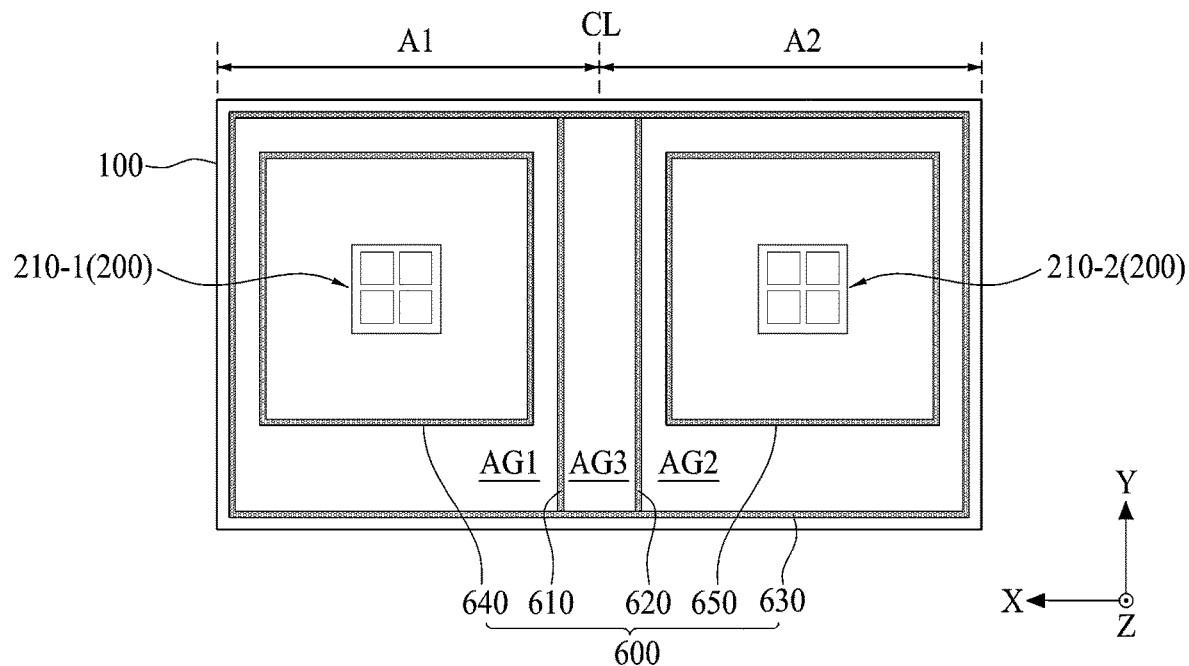
FIG. 12 illustrates a display apparatus according to another embodiment of the present disclosure.

FIG. 12 illustrates a display apparatus according to another embodiment of the present disclosure and illustrates an embodiment where a partition is further configured in the display apparatus illustrated in FIGS. 10 and 11. Hereinafter, therefore, repetitive descriptions of elements other than the partition and elements relevant thereto are omitted or will be briefly given.

With reference to FIGS. 10 to 12, the display apparatus according to another embodiment of the present disclosure may further include a partition 600 for dividing the first and second regions A1 and A2 of the display panel 100.

The partition 600 may be an air gap or a space, where sounds PVS1 and PVS2 are generated when the display panel 100 is vibrated by the first and second vibration arrays 210-1 and 210-2. For example, a partition 600 may separate the sounds PVS1 and PVS2 or a channel and may prevent or decrease the reduction of a sound characteristic caused by interference of the sounds PVS1 and PVS2. The partition 600 may be referred to as a sound blocking member, a sound separation member, a space separation member, an enclosure or a baffle, but the terms are not limited thereto.

The partition 600 according to an embodiment of the present disclosure may include first and second partition members 610 and 620 between the first and second vibration arrays 210-1 and 210-2.

The first and second partition members 610 and 620 may be between the display panel 100 and a rear structure 300 corresponding to a center region (or a middle region) of the display panel 100. The first and second partition members 610 and 620 may separate the first vibration sound PVS1 and the second vibration sound PVS2 respectively generated by the first vibration array 210-1 and the second vibration array 210-2. For example, the first and second partition members 610 and 620 may reduce, block, or prevent the transfer of a vibration, generated by the first vibration array 210-1 in the first region A1 of the display panel 100, to the second region A2 of the display panel 100, or may reduce, block, or prevent the transfer of a vibration, generated by the second vibration array 210-2 in the second region A2 of the display panel 100, to the first region A1 of the display panel 100. Therefore, the first and second partition members 610 and 620 may attenuate or absorb a vibration of the display panel 100 at a center of the display panel 100. Thus, the first and second partition members 610 and 620 may reduce, block, or prevent the transfer of a sound of the first region A1 to the second region A2, or may reduce, block, or prevent the transfer of a sound of the second region A2 to the first region A1. Accordingly, the first and second partition members 610 and 620 may separate a left sound and a right sound to further enhance a sound output characteristic of the display apparatus. Thus, the display apparatus according to an embodiment of the present disclosure may separate the left and right sounds by the first and second partition members 610 and 620 to output a two-channel stereo sound to a forward region FD in front of the display panel 100.

As an example, the partition 600 may include a material having an elastic force that enables compression to be made to some degree. For example, the partition 600 may include polyurethane, polyolefin, and/or the like, but embodiments are not limited thereto. As another example, the partition 600 may include a single-sided tape, a single-sided foam pad, a double-sided tape, a double-sided foam tape, or a double-sided foam pad, and/or the like, but embodiments are not limited thereto.

As another example, one of the first and second partition members 610 and 620 may be omitted. For example, even when one of the first and second partition members 610 and 620 is between the first vibration array 210-1 and the second vibration array 210-2, a left sound and a right sound may be separated from each other. For example, when the second partition member 620 of the first and second partition members 610 and 620 is omitted, the first partition member 610 may be disposed between the display panel 100 and the rear structure 300 to correspond to a rear center line CL of the display panel 100.

Therefore, the first and second partition members 610 and 620 may separate a left sound and a right sound to further enhance a sound output characteristic of the display apparatus. A display apparatus including the first partition member 610 or the second partition member 620 may separate the left and right sounds by the first partition member 610 or the second partition member 620 to output a two-channel stereo sound to the forward region in front of the display panel 100.

The partition 600 according to an embodiment of the present embodiment may further include a third partition member 630 between the display panel 100 and the rear structure 300. For example, the partition 600 may further include a third partition member 630 interposed between the display panel 100 and the rear structure 300.

The third partition member 630 may be disposed along a space between a rear periphery (or a rear edge) of the display panel 100 and a front periphery (or a rear edge) of the rear structure 300 to surround all of the first and second vibration arrays 200-1 and 200-2. The third partition member 630 may be referred to as an edge partition, a sound blocking member, an edge enclosure, or an edge baffle, but the term is not limited thereto. As an example, the third partition member 630 may be adjacent to or in contact with the panel connection member 400 illustrated in FIG. 11, and may be surrounded by the panel connection member 400. As another example, the third partition member 630 may be integrated as one body with the panel connection member 400.

The third partition member 630 may provide first to third air gaps AG1 to AG3 between the display panel 100 and the rear structure 500, along with the first and second partition members 610 and 620. For example, each of the first to third air gaps AG1 to AG3 may be referred to as a vibration space, a sound pressure space, a sound box, a sound part, a resonance box, or a resonance part, but the term is not limited thereto.

The first air gap AG1 may be provided in the first region A1 of the display panel 100, and may be surrounded by the first partition member 610 and the third partition member 630 in the first region A1 of the display panel 100.

The second air gap AG2 may be provided in the second region A2 of the display panel 100, and may be surrounded by the second partition member 620 and the third partition member 630 in the second region A2 of the display panel 100.

The third air gap AG3 may be provided in a third region (or a center region) of the display panel 100 surrounded by the first and second partition members 610 and 630 and the third partition member 630. For example, the third air gap AG3 may be provided between the second air gap AG2 and the first air gap AG1, including the rear center line CL of the display panel 100. The third air gap AG3 may be referred to as a sound separation space, a sound blocking space, or a sound interference prevention space, but the term is not limited thereto. The third air gap AG3 may spatially separate the first air gap AG1 from the second air gap AG2. Thus, the third air gap AG3 may reduce or prevent a resonance phenomenon or an interference phenomenon generated in a certain frequency band in each of the first air gap AG1 and the second air gap AG2.

The first vibration array 210-1 may be surrounded by the first partition member 610 and the third partition member 630 providing the first air gap AG1. The second vibration array 210-2 may be surrounded by the second partition member 620 and the third partition member 630 providing the second air gap AG2.

When one of the first and second partition members 610 and 620 is omitted, the third air gap AG3 may be omitted.

Therefore, the third partition member 630 may surround an area between the display panel 100 and the rear structure 300, and may individually surround each of the first and second vibration arrays 210-1 and 210-2, along with the first and second partition members 610 and 620, to secure a vibration space of each of the first and second vibration arrays 210-1 and 210-2. Thus, the third partition member 630 may enhance a sound pressure lever characteristic of left and right sounds. Further, the third partition member 630 may reduce or prevent sound or a sound pressure lever from being leaked to the outside through the side surface between the display panel 100 and the rear structure 300, thereby further enhancing a sound output characteristic of the display apparatus.

The partition 600 according to an embodiment of the present embodiment may further include a fourth partition member 640 and a fifth partition member 650. The fourth partition member (or a first enclosure) 640 may surround the first vibration array 210-1. The fifth partition member (or a second enclosure) 650 may surround the second vibration array 210-2.

The fourth partition member 640 may be disposed between the display panel 100 and the rear structure 300 to correspond to the first air gap AG1, and may individually (or independently) surround the first vibration array 210-1. The fourth partition member 640 according to an embodiment of the present disclosure may have a rectangular shape surrounding the first vibration array 210-1, but embodiments are not limited thereto. For example, the fourth partition member 640 may have a shape that is the same as or different from a whole shape of the first vibration array 210-1. For example, when the first partition member 200-1 has a rectangular shape, the fourth partition member 640 may have a rectangular shape having a size that is relatively greater than that of the first vibration module 200-1. For example, when the first vibration array 210-1 has a square shape, the fourth partition member 640 may have a square shape, a circular shape or an oval shape having a size relatively larger than that of the first vibration module 200-1.

The fourth partition member 640 may limit (or define) a vibration region (or a vibration area) of the display panel 100 based on the first vibration array 210-1. For example, in the first region A1 of the display panel 100, as a size of the fourth partition member 640 increases, a vibration region of the first region A1 may increase. Thus, a low-pitched sound band characteristic of a left sound may be enhanced. As another example, in the first region A1 of the display panel

100, as a size of the fourth partition member 640 decreases, the vibration region of the first region A1 may decrease. Thus, a high-pitched sound band characteristic of the left sound may be enhanced. Accordingly, a size of the fourth partition member 640 may be set based on a desired characteristic of a sound band, based on a vibration of the display panel 100.

The fifth partition member 650 may be provided between the display panel 100 and the rear structure 300 to correspond to the second air gap AG2. The fifth partition member 650 may individually (or independently) surround the second vibration array 210-2. For a left sound to be symmetrical with a right sound, the fifth partition member 650 according to an embodiment of the present disclosure may have the same shape as that of the fourth partition member 640 and a symmetrical structure with the fourth partition member 640 with respect to the rear center line CL of the display panel 100. Thus, description relevant thereto is omitted.

The fifth partition member 650 may limit (or define) a vibration region (or a vibration area) of the display panel 100 based on the second vibration array 210-2. For example, in the second region A2 of the display panel 100, as a size of the fifth partition member 650 increases, a vibration region of the second region A2 may increase. Thus, the low-pitched sound band characteristic of the left sound may be enhanced. As another example, in the second region A2 of the display panel 100, as a size of the fifth partition member 650 decreases, the vibration region of the second region A2 may decrease. Thus, the high-pitched sound band characteristic of the left sound may be enhanced. Accordingly, a size of the fifth partition member 650 may be set based on a desired characteristic of a sound band, based on a vibration of the display panel 100.

The fourth and fifth partition members 640 and 650 may limit a vibration region (or a vibration area) of each of the first and second vibration arrays 210-1 and 210-2. Thus, the fourth and fifth partition members 640 and 650 may enhance lateral symmetricity of a left sound and a right sound each generated based on a vibration of the display panel 100, and may optimize a sound pressure level characteristic and a sound reproduction band of each of the left and right sounds. As another example, when the fourth and fifth partition members 640 and 650 are provided, the third partition member 630 may be omitted. As another example, when the fourth and fifth partition members 640 and 650 are provided, one or more of the first to third partition members 610 to 630 may be omitted.

Therefore, when the display apparatus according to an embodiment of the present disclosure includes the partition 600, the sound pressure level characteristic and the sound reproduction band of each of the left and right sounds may be improved or optimized. For example, the display apparatus according to an embodiment of the present disclosure may include at least one of the first and second partition members 610 and 620. As another example, the display apparatus according to an embodiment of the present disclosure may include the third partition member 630 and one of the first and second partition members 610 and 620. As another example, the display apparatus according to an embodiment of the present disclosure may include the third to fifth partition members 630, 640, and 650. As another example, the display apparatus according to an embodiment of the present disclosure may include the first to fifth partition members 610 to 650.

The display apparatus according to another embodiment of the present disclosure may output, through the first and second vibration arrays 210-1 and 210-2, a left sound and a right sound to a forward region FD in front of the display panel 100 to provide a stereo sound to a user. Further, the display apparatus according to another embodiment of the present disclosure may separate the left and right sounds PVS1 and PVS2 by the partition 600 to output a two-channel stereo sound to the forward region FD in front of the display panel 100. Moreover, in the display apparatus according to another embodiment of the present disclosure, the flatness of a sound pressure level characteristic may be improved due to decrease of a resonance frequency caused by a plate or a protection member including a metal material implemented in each of the first and second vibration arrays 210-1 and 210-2.

Figure 13:
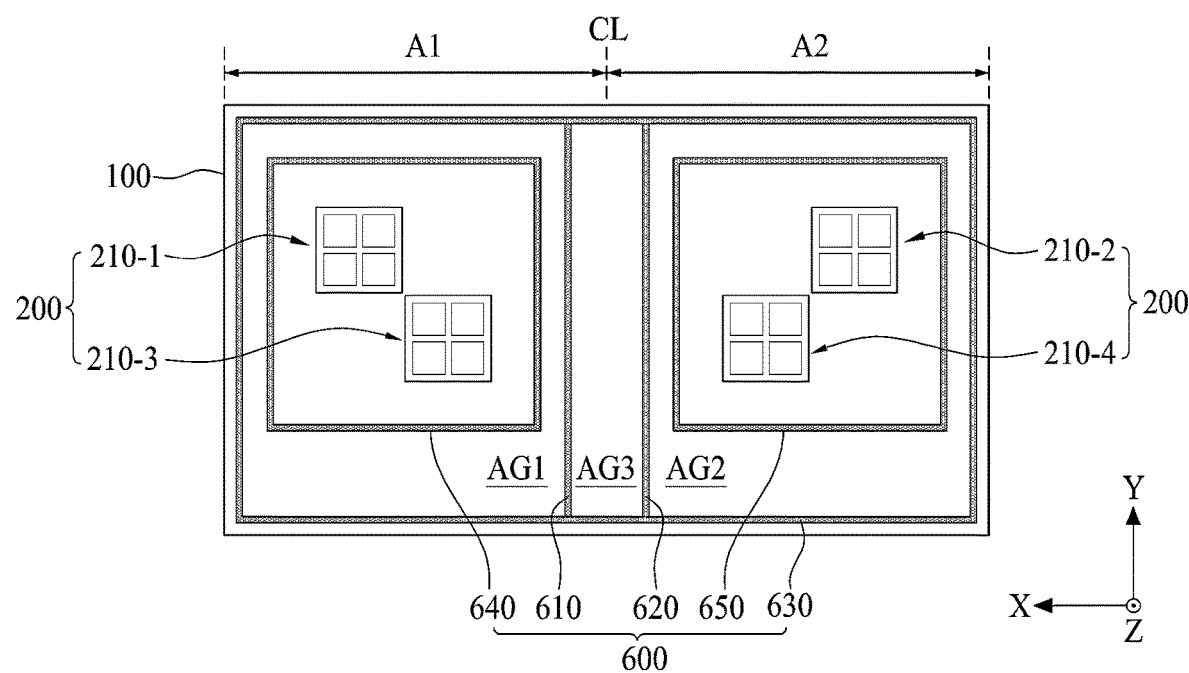
FIG. 13 illustrates a display apparatus according to another embodiment of the present disclosure.

FIG. 13 illustrates a display apparatus according to another embodiment of the present disclosure and illustrates an embodiment where the vibration device in the display apparatus illustrated in FIG. 12 is modified. Hereinafter, therefore, repetitive descriptions of elements other than the vibration device and elements relevant thereto are omitted or will be briefly given.

With reference to FIG. 13, the display apparatus according to another embodiment of the present disclosure may include first to fourth vibration arrays 210-1 to 210-4 on a rear surface of a display panel 100.

The first and third vibration arrays 210-1 and 210-3 may be alternately disposed or disposed in a diagonal direction in the first region A1 of the display panel 100. Thus, the first and third vibration arrays 210-1 and 210-3 may increase a vibration area of the first region A1 of the display panel 100. For example, the diagonal direction may be a direction between the first direction X and the second direction Y. The first and third vibration arrays 210-1 and 210-3 may be surrounded by the partition 600. For example, the first and third vibration arrays 210-1 and 210-3 may be surrounded by the fourth partition member (or a first enclosure) 640.

Each of the first and third vibration arrays 210-1 and 210-3 may vibrate the first region A1 of the display panel 100 to generate a first vibration sound (or a left sound) PVS1 or a first haptic feedback in the first region A1 of the display panel 100. For example, a vibration area of the first region A1 of the display panel 100 may increase based on a diagonal arrangement structure of the first and third vibration arrays 210-1 and 210-3 and thus, a low-pitched sound band characteristic of a left sound may be enhanced.

For example, in addition to the first vibration array 210-1, a third vibration array 210-3 may be further disposed in a first region A1 of the display panel 100, and thus, a first vibration sound or a first haptic feedback according to another embodiment of the present disclosure may be more enhanced than the first vibration sound or the first haptic feedback described above with reference to FIG. 12.

According to an embodiment of the present disclosure, the first vibration array 210-1 may be disposed close to a periphery of the first region A1 of the display panel 100. For example, the first vibration array 210-1 may be disposed in a left upper region, which is adjacent to a periphery of the display panel 100, of the first region A1 of the display panel 100. The third vibration array 210-3 may be disposed close to a center line CL of the display panel 100 in the first region A1 of the display panel 100. For example, the third vibration array 210-3 may be disposed in a right lower region, which is adjacent to the center line CL of the display panel 100, of the first region A1 of the display panel 100. The third vibration array 210-3 may be alternately disposed with respect to the first vibration array 210-1 in the first region A1 of the display panel 100, and thus, may not overlap the first vibration array 210-1 in a first direction X and a second direction Y.

The first and third vibration arrays 210-1 and 210-3 may be in parallel in the first direction X or a second direction Y in the first region A1 of the display panel 100. For example, the vibration area of the first region A1 of the display panel 100 may increase based on a parallel arrangement structure of the first and third vibration arrays 210-1 and 210-3, thereby enhancing the low-pitched sound band characteristic of the left sound. Comparing with the parallel arrangement structure of the first and third vibration arrays 210-1 and 210-3, the diagonal arrangement structure of the first and third vibration arrays 210-1 and 210-3 may further increase the vibration area of the first region A1 of the display panel 100, thereby enhancing the low-pitched sound band characteristic of the left sound. The diagonal arrangement structure of the first and third vibration arrays 210-1 and 210-3 may have an effect in which vibration arrays may be disposed in a 2×2 structure in the first region A1 of the display panel 100. Thus, the number of vibration arrays for vibrating the first region A1 of the display panel 100 may decrease by half.

The second and fourth vibration arrays 210-2 and 210-4 may be alternately disposed or disposed in a diagonal direction in the second region A2 of the display panel 100. Thus, the second and fourth vibration arrays 210-2 and 210-4 may increase a vibration area of the second region A2 of the display panel 100. The second and fourth vibration arrays 210-2 and 210-4 may be surrounded by the partition 600. For example, the second and fourth vibration arrays 210-2 and 210-4 may be surrounded by the fifth partition member (or a second enclosure) 650.

Each of the second and fourth vibration arrays 210-2 and 210-4 may vibrate the second region A2 of the display panel 100 to generate a second vibration sound (or a right sound) PVS2 or a second haptic feedback in the second region A2 of the display panel 100. For example, a vibration area of the second region A2 of the display panel 100 may increase based on a diagonal arrangement structure of the second and fourth vibration arrays 210-2 and 210-4 and thus, a low-pitched sound band characteristic of a right sound may be enhanced. For example, in addition to the second vibration array 210-2, a fourth vibration array 210-4 may be further disposed in a second region A2 of the display panel 100, and thus, a second vibration sound or a second haptic feedback according to another embodiment of the present disclosure may be more enhanced than the second vibration sound or the second haptic feedback described above with reference to FIG. 12.

According to an embodiment of the present disclosure, the second vibration array 210-2 may be disposed close to a periphery of the second region A2 of the display panel 100. For example, the second vibration array 210-2 may be disposed in a right upper region, which is adjacent to a periphery of the display panel 100, of the second region A2 of the display panel 100. Also, the first and second vibration array 210-1 and 210-2 may be a left-right symmetrical with respect to a center line CL of the display panel 100 in a first direction X, but embodiments are not limited thereto. The fourth vibration array 210-4 may be disposed close to a center line CL of the display panel 100 in the second region A2 of the display panel 100. For example, the fourth vibration array 210-4 may be disposed in a left lower region, which is adjacent to the center line CL of the display panel 100, of the second region A2 of the display panel 100. The fourth vibration array 210-4 may be alternately disposed with respect to the second vibration array 210-2 in the second region A2 of the display panel 100, and thus, may not overlap the second vibration array 210-2 in a first direction X and a second direction Y. Also, the fourth vibration array 210-4 may be a left-right symmetrical with the third vibration array 210-3 with respect to the center line CL of the display panel 100 in a first direction X, but embodiments are not limited thereto.

The second and fourth vibration arrays 210-2 and 210-4 may be in parallel in the first direction X or a second direction Y in the second region A2 of the display panel 100. For example, the vibration area of the second region A2 of the display panel 100 may increase based on a parallel arrangement structure of the second and fourth vibration arrays 210-2 and 210-4, thereby enhancing the low-pitched sound band characteristic of the right sound. Comparing with the parallel arrangement structure of the second and fourth vibration arrays 210-2 and 210-4, the diagonal arrangement structure of the second and fourth vibration arrays 210-2 and 210-4 may further increase the vibration area of the second region A2 of the display panel 100, thereby enhancing the low-pitched sound band characteristic of the right sound. The diagonal arrangement structure of the second and fourth vibration arrays 210-2 and 210-4 may have an effect in which vibration arrays may be disposed in a 2×2 structure in the second region A2 of the display panel 100. Thus, the number of vibration arrays for vibrating the second region A2 of the display panel 100 may decrease by half.

Piezoelectric layers of a plurality of vibration modules included in each of the first to fourth vibration arrays 210-1 to 210-4 may be the same or differ. For example, based on a sound characteristic needed for a display apparatus, the piezoelectric layers of the plurality of vibration modules included in each of the first to fourth vibration arrays 210-1 to 210-4 may include the same piezoelectric layers as one or more of the piezoelectric layers 211 described above with reference to FIGS. 5A to 5F, or may include different piezoelectric layers 211. When the piezoelectric layers of the plurality of vibration modules included in each of the first to fourth vibration arrays 210-1 to 210-4 may include different piezoelectric layers of the piezoelectric layers 211 described above with reference to FIGS. 5A to 5F, the vibration device 200 may have various resonance frequencies, and thus, a reproduction band and a sound pressure level characteristic of a sound which is generated based on a vibration of the vibration device 200 may considerably increase.

An arrangement structure of the first to fourth vibration arrays 210-1 to 210-4 is not limited to the arrangement structure illustrated in FIG. 13. For example, in each of the first region A1 and the second region A2 of the display panel 100, when a direction between a left upper portion and a right lower portion is referred to as a first diagonal direction and a direction between a right upper portion and a left lower portion is referred to as a second diagonal direction, the first and third vibration arrays 210-1 and 210-3 may be disposed in the first diagonal direction or the second diagonal direction, and the second and fourth vibration arrays 210-2 and 210-4 may be disposed in a diagonal direction, which is the same as or different from a diagonal arrangement direction of the first and third vibration arrays 210-1 and 210-3, among the first diagonal direction and the second diagonal direction. For example, the first vibration array 210-1 and the second vibration array 210-2 may be disposed in a left-right symmetrical structure or a left-right asymmetrical structure with respect to the center line CL of the display panel 100. Also, the third vibration array 210-3 and the fourth vibration array 210-4 may be disposed in a left-right symmetrical structure or a left-right asymmetrical structure with respect to the center line CL of the display panel 100.

Therefore, the display apparatus according to another embodiment of the present disclosure may have the same effect as that of the display apparatus described above with reference to FIG. 12, and a vibration area of each of the first and second regions A1 and A2 may increase based on a diagonal arrangement structure of the first and third vibration arrays 210-1 and 210-3 and a diagonal arrangement structure of the second and fourth vibration arrays 210-2 and 210-4, thereby more increasing a sound pressure level characteristic of the low-pitched sound band.

Figure 14A:
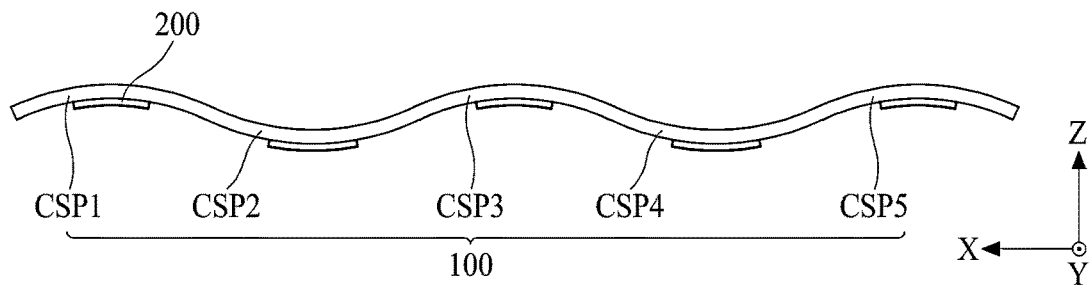
FIGS. 14A to 14C illustrate a display apparatus including a vibration device according to an embodiment of the present disclosure.
Figure 14B:
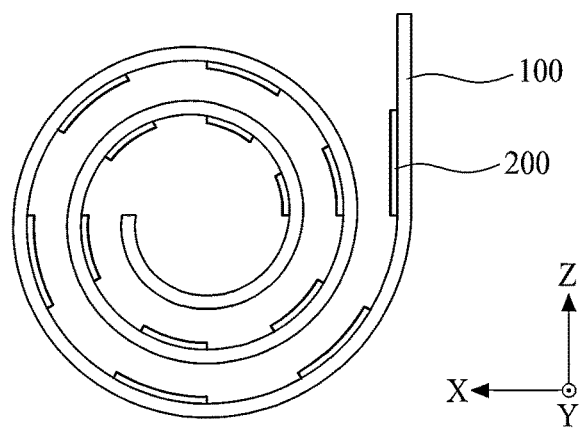
Figure 14C:
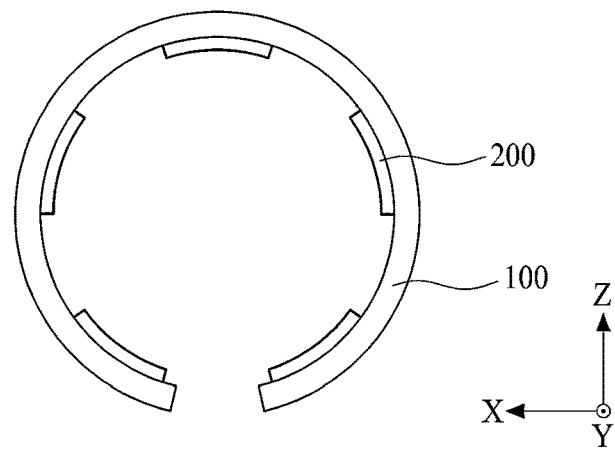

FIGS. 14A to 14C illustrate a display apparatus including a vibration device according to an embodiment of the present disclosure. FIGS. 14A to 14C illustrate a display apparatus including the vibration device described above with reference to any of FIGS. 3 to 9.

The vibration device described above with reference to FIGS. 3 to 9 may be implemented as a film type having flexibility and thus, may be applied to various application apparatuses.

With reference to FIG. 14A, the vibration device 200 according to an embodiment of the present disclosure may be applied to a commercial display apparatus or to a flexible display apparatus including a display panel 100 including a plurality of curved surface portions CSP1 to CSP5 which may be concave or convex. As an example, the vibration device 200 may be implemented to be bent in a shape having a curvature value (or a curvature radius) matching a convex portion or a concave portion of each of the curved surface portions CSP1 to CSP5 of the display panel 100. For example, the vibration device 200 may be disposed in the convex portion or the concave portion of each of the curved surface portions CSP1 to CSP5 of the display panel 100. As another example, the vibration device 200 may be implemented to have a shape matching the curvature value (or the curvature radius) of each of the curved surface portions CSP1 to CSP5 of the display panel 100, and may be on an entire (or whole) rear surface of the display panel 100.

With reference to FIG. 14B, the vibration device 200 according to an embodiment of the present disclosure may be applied to a rollable display apparatus, including a display panel 100 that may be wound in a spiral shape or unwound. As an example, the vibration device 200 may be implemented to have a shape having a curvature value (or a curvature radius) of the display panel 100 that may be wound in a spiral shape or unwound. For example, the vibration device 200 may be arranged at certain intervals on a rear surface of the display panel 100. As another example, the vibration device 200 may be implemented to have a shape matching the curvature value (or the curvature radius) of the display panel 100, and may be on the entire rear surface of the display panel 100.

With reference to FIG. 14C, the vibration device 200 according to an embodiment of the present disclosure may be applied to a wearable display apparatus including a display panel 100, which may be wound around a wrist of a user, and may be bent in a "C"-shape. As an example, the vibration device 200 may be implemented to have a shape matching a curvature value (or a curvature radius) of the display panel 100, which may be bent in the "C"-shape. For example, the vibration device 200 may be arranged at certain intervals on a rear surface of the display panel 100. As another example, the vibration device 200 may be implemented to have a shape matching the curvature value (or the curvature radius) of the display panel 100, which may be bent in the C-shape, and may be on the entire rear surface of the display panel 100.

Figure 15:
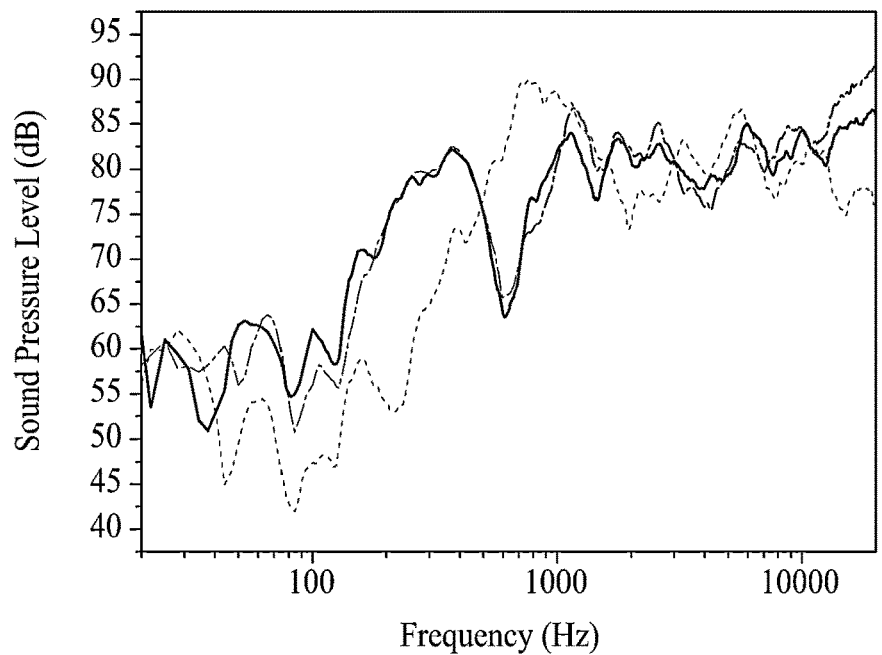
FIG. 15 illustrates a sound output characteristic of each of display apparatuses according to first and second embodiments of the present disclosure and a display apparatus according to a comparative example.

FIG. 15 illustrates a sound output characteristic of each of display apparatuses according to first and second embodiments of the present disclosure and a display apparatus according to a comparative example. FIG. 15 shows a sound output characteristic with respect to a separation distance between a plurality of vibration modules disposed in a display apparatus.

A sound output characteristic may be measured by a sound analysis apparatus. The sound analysis apparatus may include a sound card which transmits or receives a sound to or from a control personal computer (PC), an amplifier which amplifies a signal generated from the sound card and transfers the amplified signal to a vibration device, and a microphone which collects a sound generated based on driving of the vibration device in a display panel. The sound collected through the microphone may be input to the control PC through the sound card, and a control program may check the input sound to analyze a sound output characteristic of the vibration device.

A dotted line of FIG. 15 represents a result obtained by measuring a sound output characteristic of the display apparatus according to the comparative example where a separation distance between a plurality of vibration modules is 3 cm. A thick solid line of FIG. 15 represents a result obtained by measuring a sound output characteristic of the display apparatus according to the first embodiment where a separation distance between a plurality of vibration modules is 1 mm. A one-dot dashed line of FIG. 15 represents a result obtained by measuring a sound output characteristic of the display apparatus according to the second embodiment where a separation distance between a plurality of vibration modules is 0.5 mm. In FIG. 15, the abscissa axis represents a frequency (Hz), and the ordinate axis represents a sound pressure level (SPL) (dB).

With reference to FIG. 15, it may be seen that a sound pressure level characteristic of the low-pitched sound band varies with respect to a separation distance between a plurality of vibration modules. For example, comparing with the display apparatus according to the comparative example, it may be seen that the display apparatus according to the first embodiment has a high sound pressure level in the low-pitched sound band (for example, about 500 Hz or less). Also, comparing with the display apparatus according to the comparative example, it may be seen that the display apparatus according to the second embodiment has a high sound pressure level in the low-pitched sound band (for example, about 500 Hz or less). Also, it may be seen that the display apparatuses according to the first and second embodiments have similar sound pressure level characteristics in a total frequency band.

Figure 16:
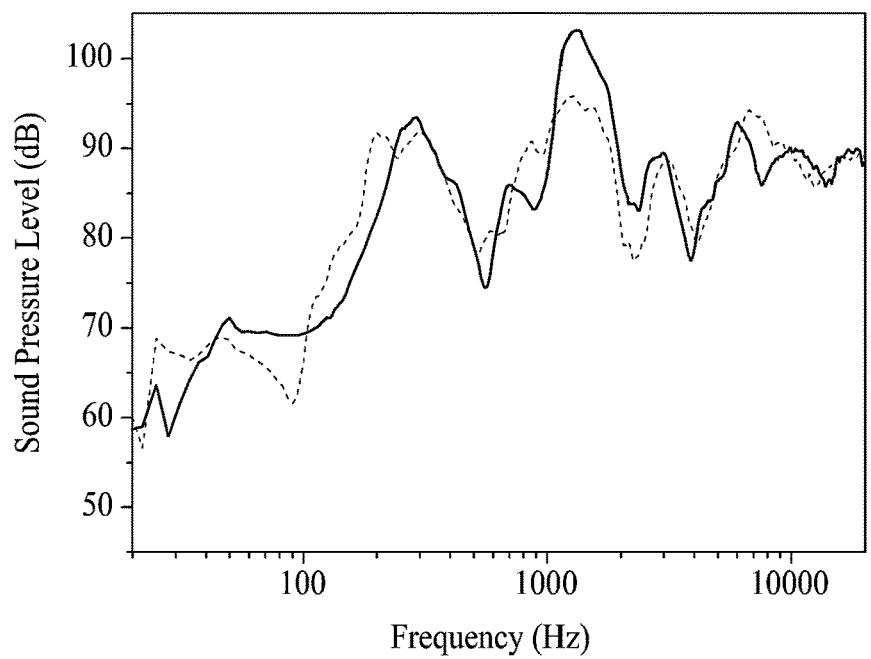
FIG. 16 illustrates a sound output characteristic of each of the display apparatus according to first and a third embodiments of the present disclosure.

FIG. 16 illustrates a sound output characteristic of each of the display apparatus according to a first and a third embodiments of the present disclosure. FIG. 16 shows a sound output characteristic with respect to a separation distance between a plurality of vibration modules disposed in a display apparatus. Measurement of a sound output characteristic is the same as the measurement described above with reference to FIG. 15, and thus, its repetitive description is omitted.

A thick solid line of FIG. 16 represents a result obtained by measuring a sound output characteristic of the display apparatus according to the first embodiment where a separation distance between a plurality of vibration modules is 1 mm. A dotted line of FIG. 16 represents a result obtained by measuring a sound output characteristic of the display apparatus according to the third embodiment where a separation distance between a plurality of vibration modules is 5 mm. In FIG. 16, the abscissa axis represents a frequency (Hz), and the ordinate axis represents a sound pressure level (SPL) (dB).

With reference to FIG. 16, comparing with the display apparatus according to the first embodiment, it may be seen that the display apparatus according to the third embodiment has a low sound pressure level in the low-pitched sound band (for example, about 100 Hz to about 200 Hz and about 40 Hz or less) and has a high sound pressure level in about 40 Hz to about 100 Hz. Also, comparing with the display apparatus according to the first embodiment, it may be seen that the display apparatus according to the third embodiment is improved in a dip phenomenon occurring in about 40 Hz to about 100 Hz. Accordingly, comparing with the display apparatus according to the comparative example illustrated in FIG. 15, it may be seen that sound output characteristics of the display apparatuses according to the first and third embodiments are improved in the low-pitched sound band (for example, about 500 Hz or less).

Therefore, as seen in FIGS. 15 and 16, in an embodiment of the present disclosure, one single vibration device may be configured by arranging or tiling a plurality of vibration modules having a relatively small size to have a separation distance 3 cm or less (for example, 0.5 mm, 1 mm, or 5 mm), thereby improving a sound output characteristic of the low-pitched sound band which is generated in a display panel based on a vibration of a vibration device having a large-area effect, based on the enlargement of an area of the vibration device.

Figure 17:
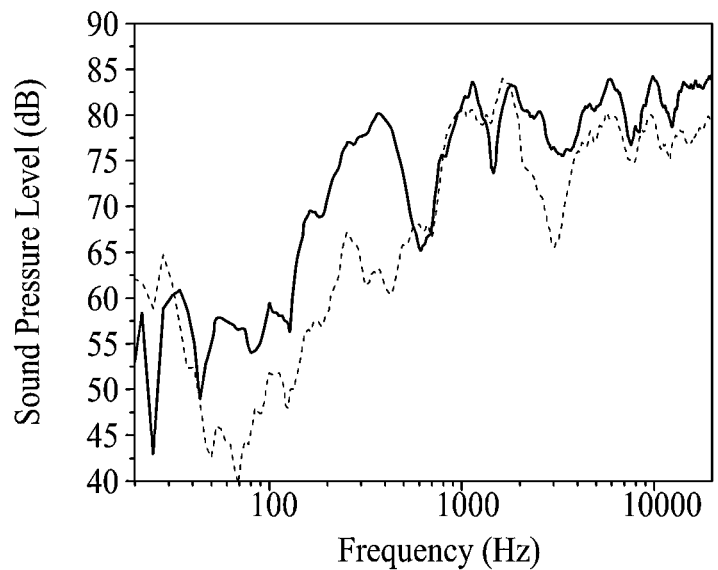
FIG. 17 illustrates a sound output characteristic of each of a display apparatus according to an embodiment of the present disclosure and the display apparatus according to the comparative example.

FIG. 17 illustrates a sound output characteristic of each of a display apparatus according to an embodiment of the present disclosure and the display apparatus according to the comparative example. FIG. 17 shows a sound output characteristic based on a tiling method performed on a plurality of vibration modules. Measurement of a sound output characteristic is the same as the measurement described above with reference to FIG. 15, and thus, its repetitive description is omitted.

A thick solid line of FIG. 17 shows a result obtained by measuring a sound output characteristic of the display apparatus according to an embodiment of the present disclosure configured by tiling a plurality of vibration modules in a protection member including a plastic material. A dotted line of FIG. 17 shows a result obtained by measuring a sound output characteristic of the display apparatus according to the comparative example configured by directly tiling a plurality of vibration modules in a display panel without a protection member. In FIG. 17, the abscissa axis represents a frequency (Hz), and the ordinate axis represents a sound pressure level (SPL) (dB).

With reference to FIG. 17, comparing with the display apparatus according to the comparative example, it may be seen that the display apparatus according to an embodiment of the present disclosure has a high sound pressure level in the low-pitched sound band (for example, about 30 Hz to about 500 Hz) and has a sound pressure level characteristic of 40 dB or more in a total frequency range. For example, in the comparative example, it may be seen that, because the plurality of vibration modules are directly tiled in the display panel without a protection member, a large-area effect based on tiling of the plurality of vibration modules is not implemented and a sound pressure level in 30 Hz to 500 Hz is reduced by an independent vibration of each of the plurality of vibration modules, and due to this, a reproduction band of a sound decreases. On the other hand, in an embodiment of the present disclosure, it may be seen that, because the plurality of vibration modules are tiled in the protection member including the plastic material, a large-area effect based on tiling of the plurality of vibration modules is realized, and thus, the plurality of vibration modules do not independently vibrate but vibrate as one single vibrator, thereby improving a sound pressure level characteristic of the low-pitched sound band (for example, about 30 Hz to about 500 Hz) and increasing a reproduction band of a sound therein.

Figure 18:
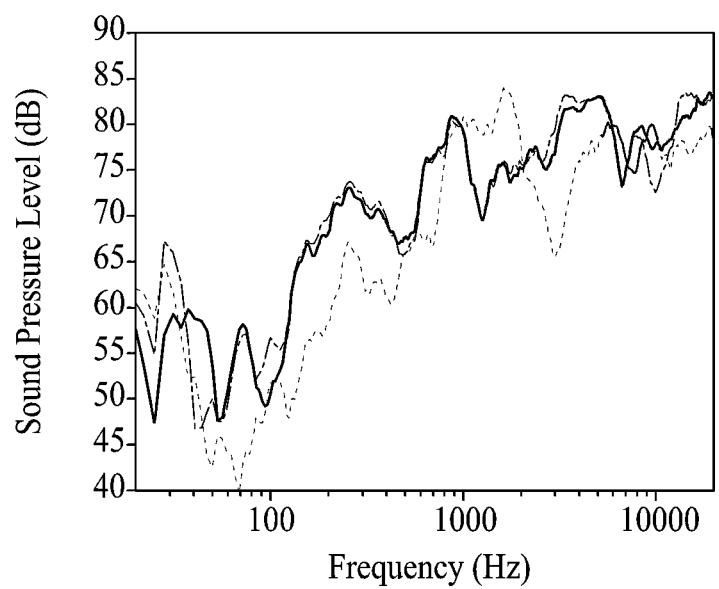
FIG. 18 illustrates a sound output characteristic of each of the display apparatuses according to the first and second embodiments of the present disclosure and the display apparatus according to the comparative example.

FIG. 18 illustrates a sound output characteristic of each of the display apparatuses according to the first and second embodiments of the present disclosure and the display apparatus according to the comparative example. FIG. 18 shows a sound output characteristic based on a tiling method performed on a plurality of vibration modules. Measurement of a sound output characteristic is the same as the measurement described above with reference to FIG. 15, and thus, its repetitive description is omitted.

A thick solid line of FIG. 18 shows a result obtained by measuring a sound output characteristic of the display apparatus according to the first embodiment of the present disclosure configured by tiling a plurality of vibration modules in a plate (or a protection member) including a metal material. A one-dot dashed line of FIG. 18 shows a result obtained by measuring a sound output characteristic of the display apparatus according to the second embodiment of the present disclosure configured by tiling one surface of each of a plurality of vibration modules in a plate (or a protection member) including a metal material and adding a protection member including a plastic material to the other surface of each of the plurality of vibration modules. A dotted line of FIG. 18 shows a result obtained by measuring a sound output characteristic of the display apparatus according to the comparative example configured by directly tiling a plurality of vibration modules in a display panel without a protection member. In FIG. 18, the abscissa axis represents a frequency (Hz), and the ordinate axis represents a sound pressure level (SPL) (dB).

With reference to FIG. 18, comparing with the display apparatus according to the comparative example, it may be seen that each of the display apparatuses according to the first and second embodiments of the present disclosure has a high sound pressure level in the low-pitched sound band (for example, about 30 Hz to about 500 Hz) and has a sound pressure level characteristic of 45 dB or more in a total frequency range. For example, in the comparative example, it may be seen that, because the plurality of vibration modules are directly tiled in the display panel without a protection member, a large-area effect based on tiling of the plurality of vibration modules is not implemented and a sound pressure level in 30 Hz to 500 Hz is reduced by an independent vibration of each of the plurality of vibration modules, and due to this, a reproduction band of a sound decreases. On the other hand, in each of the first and second embodiments of the present disclosure, it may be seen that, because the plurality of vibration modules are tiled in the protection member, a large-area effect based on tiling of the plurality of vibration modules is realized. Accordingly, the plurality of vibration modules do not independently vibrate but vibrate as one single vibrator, and a resonance frequency of each of the plurality of vibration modules is reduced due to an increase in mass (or weight) caused by the plate (or the protection member) including the metal material, thereby improving a sound pressure level characteristic of the low-pitched sound band (for example, about 30 Hz to about 500 Hz) and increasing a reproduction band of a sound therein.

Moreover, it may be seen that the display apparatuses according to the first and second embodiments have similar sound pressure level characteristics in a total frequency range.

Therefore, as seen in FIGS. 17 and 18, in an embodiment of the present disclosure, one single vibration device may be configured by tiling a plurality of vibration modules having a relatively small size in a protection member (or a plate) including a plastic material or a metal material, thereby improving a sound output characteristic of the low-pitched sound band which is generated in a display panel based on a vibration of a vibration device having a large-area effect, based on the enlargement of an area of the vibration device.

The vibration device according to an embodiment of the present disclosure may be applied to a vibration device disposed on a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration device according to an embodiment of the present disclosure may be applied to organic light emitting lighting apparatuses or inorganic light emitting lighting apparatuses. When a vibration device of an embodiment of the present disclosure is applied to a lighting apparatuses, the vibration device may act as lighting and a speaker. Also, when the display apparatus of an embodiment of the present disclosure is applied to a mobile device, the vibration device may act as one or more of a speaker, a receiver, and a haptic, but embodiments of the present disclosure are not limited thereto.

A vibration device according to an embodiment of the present disclosure will be described below.

According to an embodiment of the present disclosure, a vibration device may include a vibration array configured to include a plurality of vibration modules, the plurality of vibration modules may be configured to be spaced apart from one another by a first interval or a predetermined interval of less than 3 cm in a first direction. The interval is determined in way to drive the plurality of the vibration modules as one single module.

According to some embodiments of the present disclosure, the plurality of vibration modules may be configured to be spaced apart from one another by a second interval of less than 3 cm in a second direction intersecting with the first direction.

According to some embodiments of the present disclosure, an interval between the plurality of vibration modules may about 0.1 mm to about 5 mm, with respect to the first direction and a second direction intersecting with the first direction.

According to some embodiments of the present disclosure, the vibration array may further include a first protection member connected to a first surface of each of the plurality of vibration modules in common by a first adhesive layer; and/or a second protection member connected to a second surface of each of the plurality of vibration modules in common by a second adhesive layer.

According to some embodiments of the present disclosure, the first adhesive layer and/or the second adhesive layer may be configured to be connected to each other between the plurality of vibration modules.

According to some embodiments of the present disclosure, the vibration device may include a plate on or in the first protection member on or in the second protection member.

According to some embodiments of the present disclosure, the plate may include a metal material.

According to some embodiments of the present disclosure, the vibration array may further include a cover member surrounding the plurality of vibration modules.

According to some embodiments of the present disclosure, the cover member may include at least one of an epoxy resin, an acryl resin, a silicone resin, or a urethane resin.

According to some embodiments of the present disclosure, the vibration array may further include a protection member on the cover member, and a size of the protection member may be greater than or equal to a size of the cover member.

According to some embodiments of the present disclosure, the protection member may include a metal material.

According to some embodiments of the present disclosure, the vibration array may further include a first protection member on a first surface of the cover member; and a second protection member on a second surface, which is opposite to the first surface, of the cover member, one of the first protection member and the second protection member may include a metal material, and the other protection member of the first protection member and the second protection member may include a plastic material.

According to some embodiments of the present disclosure, the vibration device may include a flexible cable electrically connected to each of the plurality of vibration modules, the flexible cable may include a body portion including a terminal portion; and a plurality of lines protruding from the body portion, the plurality of lines being between each of the plurality of vibration modules and the cover member.

According to some embodiments of the present disclosure, the vibration device may include a flexible cable electrically connected to each of the plurality of vibration modules, the flexible cable may include a base member including a terminal portion; and a plurality of lines protruding from the base member.

According to some embodiments of the present disclosure, some of the plurality of lines may be electrically connected to a first surface of each of the plurality of vibration modules, and the other lines of the plurality of lines may be electrically connected to a second surface opposite to the first surface of each of the plurality of vibration modules.

According to some embodiments of the present disclosure, the vibration device may include a flexible cable electrically connected to each of the plurality of vibration modules, each of the plurality of vibration modules may include a first surface and a second surface opposite to the first surface, and the flexible cable may include a first line in the second direction and electrically connected to first surfaces of some of the plurality of vibration modules arranged in the same column parallel to the second direction; a second line disposed in the second direction and electrically connected to second surfaces of the some of the plurality of vibration modules; a third line extending in the first direction from the first line, the third line being electrically connected to a first surface of each of the plurality of vibration modules; and a fourth line extending in the first direction from the second line, the fourth line being electrically connected to a second surface of each of the plurality of vibration modules.

According to an embodiment of the present disclosure, the plurality of vibration modules may be implemented as a single vibration device which is driven as one single body without being independently driven.

According to some embodiments of the present disclosure, each of the plurality of vibration modules may include a vibration layer, and the vibration layer may include a plurality of inorganic material portions having a piezoelectric characteristic; and an organic material portion between the plurality of inorganic material portions.

According to some embodiments of the present disclosure, each of the plurality of vibration modules may include a first electrode layer on a first surface of the vibration layer; and a second electrode layer on a second surface, which is opposite to the first surface, of the vibration layer.

According to some embodiments of the present disclosure, each of the plurality of inorganic material portions may be configured to have a piezoelectric deformation coefficient of 1,000 pC/N or more in a thickness direction.

According to some embodiments of the present disclosure, each of the plurality of inorganic material portions may be configured to comprise a formula $(Pb_{A-B}C_B)((Mg_{1/3}Nb_{2/3})_a(Ni_{1/3}Nb_{2/3})_b Zr_c Ti_d)O_3$, in the formula, C is one of calcium (Ca), strontium (Sr), and barium (Ba), $a+b+c+d=1$, $0.02 \leq B \leq 0.20$, $0.80 \leq A-B \leq 0.98$, $0.05 \leq a \leq 0.25$, $0.05 \leq b \leq 0.25$, $0.10 \leq c \leq 0.50$, and $0.10 \leq d \leq 0.50$.

According to some embodiments of the present disclosure, the plurality of inorganic material portions and a plurality of organic material portions may be alternately and repeatedly arranged, and a size of each of the plurality of organic material portions progressively may decrease in a direction from a center portion to both peripheries of the vibration layer.

According to some embodiments of the present disclosure, each of the plurality of inorganic material portions may have one or more of a line shape, a circular shape, an oval shape, and a polygonal shape.

According to an embodiment of the present disclosure, a vibration device may include a vibration array configured to include a plurality of vibration modules arranged in i×j form in a first direction and a second direction intersecting with each other on the same plane, where i is a natural number of 2 or more, and j is a natural number which is equal to i or is more than or equal to 1, the plurality of vibration modules may be configured to be spaced apart from one another by an interval of less than 3 cm in each of the first direction and the second direction.

According to some embodiments of the present disclosure, the vibration array may further include a cover member surrounding the plurality of vibration modules.

According to some embodiments of the present disclosure, the cover member may include at least one of an epoxy resin, an acryl resin, a silicone resin, or a urethane resin.

According to some embodiments of the present disclosure, the vibration array may further include a protection member on the cover member, and a size of the protection member may be greater than or equal to a size of the cover member.

According to some embodiments of the present disclosure, the protection member may include a metal material.

According to some embodiments of the present disclosure, the vibration array may further include a first protection member on a first surface of the cover member; and a second protection member on a second surface, which is opposite to the first surface, of the cover member, one of the first protection member and the second protection member may include a metal material, and the other protection member of the first protection member and the second protection member may include a plastic material.

According to some embodiments of the present disclosure, the vibration device may further include a flexible cable electrically connected to each of the plurality of vibration modules, the flexible cable may include a body portion including a terminal portion; a plurality of first lines in the body portion; and a plurality of second lines respectively protruding from the plurality of first lines in the second direction, the plurality of second lines being between the vibration modules and the cover member.

According to some embodiments of the present disclosure, some of the plurality of second lines may be electrically connected to a first surface of each of the plurality of vibration modules, and the other second lines of the plurality of second lines may be electrically connected to a second surface opposite to the first surface of each of the plurality of vibration modules.

According to some embodiments of the present disclosure, some of the plurality of second lines may be electrically connected to a first surface of vibration modules arranged in the same column parallel to the second direction, and the other second lines of the plurality of second lines may electrically connected to a second surface opposite to the first surface of the vibration modules arranged in the same column parallel to the second direction, and the flexible cable may include at least one third line protruding from the some of the plurality of second lines, the at least one third line being electrically connected to the first surface of each of the plurality of vibration modules; and at least one fourth line protruding from the other second lines of the plurality of second lines, the at least one fourth line being electrically connected to the second surface of each of the plurality of vibration modules.

According to some embodiments of the present disclosure, each of the plurality of vibration modules may include a vibration layer, and the vibration layer may include a plurality of inorganic material portions having a piezoelectric characteristic; and an organic material portion between the plurality of inorganic material portions.

According to some embodiments of the present disclosure, each of the plurality of vibration modules may include a first electrode layer on a first surface of the vibration layer; and a second electrode layer on a second surface opposite to the first surface of the vibration layer.

According to some embodiments of the present disclosure, each of the plurality of inorganic material portions may be configured to have a piezoelectric deformation coefficient of 1,000 pC/N or more in a thickness direction.

According to some embodiments of the present disclosure, each of the plurality of inorganic material portions may be configured to comprise a formula $(Pb_{A-B}C_B)((Mg_{1/3}Nb_{2/3})_a(Ni_{1/3}Nb_{2/3})_b Zr_c Ti_d)O_3$, in the formula, C is one of calcium (Ca), strontium (Sr), and barium (Ba), $a+b+c+d=1$, $0.02 \leq B \leq 0.20$, $0.80 \leq A-B \leq 0.98$, $0.05 \leq a \leq 0.25$, $0.05 \leq b \leq 0.25$, $0.10 \leq c \leq 0.50$, and $0.10 \leq d \leq 0.50$.

A display apparatus according to an embodiment of the present disclosure will be described below.

According to an embodiment of the present disclosure, a display panel configured to display an image; and a vibration apparatus configured to include at least one vibration array on a rear surface of the display panel to vibrate the display panel, the at least one vibration array may include the vibration device, the vibration device may include a vibration array configured to include a plurality of vibration modules, the plurality of vibration modules may be configured to be spaced apart from one another by a first interval or a predetermined interval of less than 3 cm in a first direction.

According to an embodiment of the present disclosure, a display panel configured to display an image; and a vibration apparatus configured to include at least one vibration array on a rear surface of the display panel to vibrate the display panel, the at least one vibration array may include the vibration device, the vibration device may include a vibration array configured to include a plurality of vibration modules arranged in i×j form in a first direction and a second direction intersecting with each other on the same plane, where i is a natural number of 2 or more, and j is a natural number which is equal to i or is more than or equal to 1, the plurality of vibration modules may be configured to be spaced apart from one another by an interval of less than 3 cm in each of the first direction and the second direction.

According to some embodiments of the present disclosure, each of the plurality of vibration modules may include a piezoelectric layer, and the piezoelectric layer may include a plurality of inorganic material portions having a piezoelectric characteristic; and an organic material portion between the plurality of inorganic material portions.

According to some embodiments of the present disclosure, each of the plurality of vibration modules may include a first electrode layer on a first surface of the piezoelectric layer; and a second electrode layer on a second surface opposite to the first surface of the piezoelectric layer.

According to some embodiments of the present disclosure, each of the plurality of inorganic material portions may be configured to have a piezoelectric deformation coefficient of 1,000 pC/N or more in a thickness direction.

According to some embodiments of the present disclosure, each of the plurality of inorganic material portions may be configured to comprise a formula $(Pb_{A-B}C_B)((Mg_{1/3}Nb_{2/3})_a(Ni_{1/3}Nb_{2/3})_bZr_cTi_d)O_3$, in the formula, C is one of calcium (Ca), strontium (Sr), and barium (Ba), $a+b+c+d=1$, $0.02 \leq B \leq 0.20$, $0.80 \leq A-B \leq 0.98$, $0.05 \leq a \leq 0.25$, $0.05 \leq b \leq 0.25$, $0.10 \leq c \leq 0.50$, and $0.10 \leq d \leq 0.50$.

According to some embodiments of the present disclosure, the plurality of inorganic material portions and a plurality of organic material portions may be alternately and repeatedly arranged, and a size of each of the plurality of organic material portions progressively may decrease in a direction from a center portion to both peripheries of the vibration layer.

According to some embodiments of the present disclosure, each of the plurality of inorganic material portions may have one or more of a line shape, a circular shape, an oval shape, and a polygonal shape.

According to some embodiments of the present disclosure, the display panel may include a first region and a second region overlapping a display area configured to display an image, and the vibration apparatus may include a first vibration array in the first region; and a second vibration array in the second region.

According to some embodiments of the present disclosure, the display apparatus may include a supporting member on a rear surface of the display panel; a first enclosure between the rear surface of the display panel and the supporting member to surround the first vibration array; and a second enclosure between the rear surface of the display panel and the supporting member to surround the second vibration array.

According to some embodiments of the present disclosure, the display panel may include a first region and a second region overlapping a display area configured to display an image, and the vibration apparatus may include a first vibration array in the first region; a second vibration array in the second region; a third vibration array in the first region to be separately disposed with respect to the first vibration array; and a fourth vibration array in the second region to be separately disposed with respect to the second vibration array.

According to some embodiments of the present disclosure, the display apparatus may include a supporting member on a rear surface of the display panel; a first enclosure between the rear surface of the display panel and the supporting member to surround the first and third vibration arrays; and a second enclosure between the rear surface of the display panel and the supporting member to surround the second and fourth vibration arrays.

According to some embodiments of the present disclosure, the first vibration array and the third vibration array may be alternately disposed in a diagonal direction, and the second vibration array and the fourth vibration array may be alternately disposed in a diagonal direction.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A vibration device, comprising:
  a vibration array configured to include a plurality of vibration modules between a first protection member and a second protection member,
  wherein:
  the plurality of vibration modules are configured to be spaced apart from one another by a first interval of less than 3 cm in a first direction at a same plane between the first protection member and the second protection member;
  the first protection member is configured to be connected to a first surface of each of the plurality of vibration modules in common by a first adhesive layer; and
  the second protection member is configured to be connected to a second surface of each of the plurality of vibration modules in common by a second adhesive layer.

2. The vibration device of claim 1, wherein the plurality of vibration modules are configured to be spaced apart from one another by a second interval of less than 3 cm in a second direction intersecting with the first direction.

3. The vibration device of claim 2, further comprising a flexible cable electrically connected to each of the plurality of vibration modules,
  wherein each of the plurality of vibration modules comprises the first surface and the second surface opposite to the first surface, and
  wherein the flexible cable comprises:
    a first line disposed in the second direction and electrically connected to the first surface of some of the plurality of vibration modules arranged in a same column parallel to the second direction;

a second line disposed in the second direction and electrically connected to the second surface of the some of the plurality of vibration modules;
a third line extending in the first direction from the first line, the third line being electrically connected to the first surface of each of the plurality of vibration modules; and
a fourth line extending in the first direction from the second line, the fourth line being electrically connected to the second surface of each of the plurality of vibration modules.

4. The vibration device of claim 1, wherein an interval between the plurality of vibration modules is about 0.1 mm to about 5 mm, with respect to the first direction and a second direction intersecting with the first direction.

5. The vibration device of claim 1, wherein the first adhesive layer and the second adhesive layer are configured to be connected to each other between the plurality of vibration modules.

6. The vibration device of claim 1, further comprising a plate on the first protection member or the second protection member.

7. The vibration device of claim 6, wherein the plate comprises a metal material.

8. The vibration device of claim 1,
wherein each of the plurality of vibration modules comprises a vibration layer, and
wherein the vibration layer comprises:
a plurality of inorganic material portions having a piezoelectric characteristic; and
an organic material portion between the plurality of inorganic material portions.

9. The vibration device of claim 8,
wherein each of the plurality of vibration modules comprises:
a first electrode layer on a first surface of the vibration layer; and
a second electrode layer on a second surface opposite to the first surface of the vibration layer.

10. The vibration device of claim 8, wherein each of the plurality of inorganic material portions is configured to have a piezoelectric deformation coefficient of 1,000 pC/N or more in a thickness direction.

11. The vibration device of claim 8, wherein each of the plurality of inorganic material portions is configured to comprise a formula $(Pb_{A-B}C_B)((Mg_{1/3}Nb_{2/3})_a(Ni_{1/3}Nb_{2/3})_b Zr_cTi_d)O_3$,
in the formula, C is one of calcium Ca, strontium Sr, and barium Ba, $a+b+c+d=1$, $0.02 \leq B \leq 0.20$, $0.80 \leq A-B \leq 0.98$, $0.05 \leq a \leq 0.25$, $0.05 \leq b \leq 0.25$, $0.10 \leq c \leq 0.50$, and $0.10 \leq d \leq 0.50$.

12. The vibration device of claim 8, wherein the plurality of inorganic material portions and a plurality of organic material portions are alternately and repeatedly arranged, and
a size of each of the plurality of organic material portions progressively decreases in a direction from a center portion to both peripheries of the vibration layer.

13. The vibration device of claim 8, wherein each of the plurality of inorganic material portions has one or more of a line shape, a circular shape, an oval shape, and a polygonal shape.

14. A display apparatus, comprising:
a display panel configured to display an image; and
a vibration apparatus configured to include at least one vibration array on a rear surface of the display panel to vibrate the display panel,
wherein the at least one vibration array comprises the vibration device of claim 1.

15. The display apparatus of claim 14,
wherein the display panel comprises a first region and a second region overlapping a display area configured to display an image, and
wherein the vibration apparatus comprises:
a first vibration array in the first region; and
a second vibration array in the second region.

16. The display apparatus of claim 15, further comprising:
a supporting member on the rear surface of the display panel;
a first enclosure between the rear surface of the display panel and the supporting member to surround the first vibration array; and
a second enclosure between the rear surface of the display panel and the supporting member to surround the second vibration array.

17. The display apparatus of claim 14,
wherein the display panel comprises a first region and a second region overlapping a display area configured to display an image, and
wherein the vibration apparatus comprises:
a first vibration array in the first region;
a second vibration array in the second region;
a third vibration array in the first region to be separately disposed with respect to the first vibration array; and
a fourth vibration array in the second region to be separately disposed with respect to the second vibration array.

18. The display apparatus of claim 17, further comprising:
a supporting member on the rear surface of the display panel;
a first enclosure between the rear surface of the display panel and the supporting member to surround the first and third vibration arrays; and
a second enclosure between the rear surface of the display panel and the supporting member to surround the second and fourth vibration arrays.

19. The display apparatus of claim 18, wherein the first vibration array and the third vibration array are alternately disposed in a diagonal direction, and
the second vibration array and the fourth vibration array are alternately disposed in a diagonal direction.

20. A vibration device, comprising:
a vibration array configured to include:
a plurality of vibration modules; and
a cover member surrounding the plurality of vibration modules, the cover member contacting the plurality of vibration modules,
wherein the plurality of vibration modules are configured to be spaced apart from one another by a first interval of less than 3 cm in a first direction.

21. The vibration device of claim 20, wherein the cover member comprises at least one of an epoxy resin, an acryl resin, a silicone resin, or a urethane resin.

22. The vibration device of claim 20,
wherein the vibration array further comprises a protection member on the cover member, and
wherein a size of the protection member is greater than or equal to a size of the cover member.

23. The vibration device of claim 22, wherein the protection member comprises a metal material.

24. The vibration device of claim 20,
wherein the vibration array further comprises:
a first protection member at a first surface of the cover member; and a second protection member at a second surface opposite to the first surface of the cover member,
wherein one of the first protection member and the second protection member comprises a metal material, and
wherein the other protection member of the first protection member and the second protection member comprises a plastic material.

25. The vibration device of claim 20, further comprising a flexible cable electrically connected to each of the plurality of vibration modules,
wherein the flexible cable comprises:
a base member including a terminal portion; and
a plurality of lines protruding from the base member, the plurality of lines being between each of the plurality of vibration modules and the cover member.

26. The vibration device of claim 25,
wherein some of the plurality of lines are electrically connected to a first surface of each of the plurality of vibration modules, and
wherein the other lines of the plurality of lines are electrically connected to a second surface opposite to the first surface of each of the plurality of vibration modules.

27. A vibration device, comprising:
a vibration array configured to include a plurality of vibration modules between a first protection member and a second protection member,
wherein:
the plurality of vibration modules are configured to be spaced apart from one another by a first interval of less than 3 cm in a first direction at a same plane between the first protection member and the second protection member; and
the plurality of vibration modules are implemented as a single vibration device which is driven as one single body, without each being independently driven.

28. A vibration device, comprising:
a vibration array configured to include:
a plurality of vibration modules arranged in i×j form in a first direction and a second direction intersecting with each other on the same plane, where i is a natural number of 2 or more, and j is a natural number which is equal to i or is more than or equal to 1; and
a cover member surrounding the plurality of vibration modules, the cover member contacting the plurality of vibration modules,
wherein the plurality of vibration modules are configured to be spaced apart from one another by an interval of less than 3 cm in each of the first direction and the second direction.

29. The vibration device of claim 28, wherein the cover member is configured to surround a first surface, a second surface, and side surfaces of each of the plurality of vibration modules.

30. The vibration device of claim 29, wherein the cover member comprises at least one of an epoxy resin, an acryl resin, a silicone resin, or a urethane resin.

31. The vibration device of claim 29,
wherein the vibration array further comprises a protection member on the cover member, and
wherein a size of the protection member is greater than or equal to a size of the cover member.

32. The vibration device of claim 31, wherein the protection member comprises a metal material.

33. The vibration device of claim 29,
wherein the vibration array further comprises:
a first protection member at a first surface of the cover member; and
a second protection member at a second surface opposite to the first surface of the cover member,
wherein one of the first protection member and the second protection member comprises a metal material, and
wherein the other protection member of the first protection member and the second protection member comprises a plastic material.

34. The vibration device of claim 29, further comprising a flexible cable electrically connected to each of the plurality of vibration modules,
wherein the flexible cable comprises:
a body portion including a terminal portion;
a plurality of first lines in the body portion; and
a plurality of second lines respectively protruding from the plurality of first lines in the second direction, the plurality of second lines being between the vibration modules and the cover member.

35. The vibration device of claim 34,
wherein some of the plurality of second lines are electrically connected to the first surface of each of the plurality of vibration modules, and
wherein the other second lines of the plurality of second lines are electrically connected to the second surface opposite to the first surface of each of the plurality of vibration modules.

36. The vibration device of claim 35,
wherein some of the plurality of second lines are electrically connected to a first surface of vibration modules arranged in the same column parallel to the second direction,
wherein the other second lines of the plurality of second lines are electrically connected to a second surface opposite to the first surface of the vibration modules arranged in the same column parallel to the second direction, and
wherein the flexible cable comprises:
at least one third line protruding from the some of the plurality of second lines, the at least one third line being electrically connected to the first surface of each of the plurality of vibration modules; and
at least one fourth line protruding from the other second lines of the plurality of second lines, the at least one fourth line being electrically connected to the second surface of each of the plurality of vibration modules.

37. The vibration device of claim 28,
wherein each of the plurality of vibration modules comprises a vibration layer, and
wherein the vibration layer comprises:
a plurality of inorganic material portions having a piezoelectric characteristic; and
an organic material portion between the plurality of inorganic material portions.

38. The vibration device of claim 37,
wherein each of the plurality of vibration modules comprises:
a first electrode layer on a first surface of the vibration layer; and
a second electrode layer on a second surface opposite to the first surface of the vibration layer.

39. The vibration device of claim 37, wherein each of the plurality of inorganic material portions is configured to have a piezoelectric deformation coefficient of 1,000 pC/N or more in a thickness direction.

40. The vibration device of claim 37, wherein each of the plurality of inorganic material portions is configured to comprise a formula $(Pb_{A-B}C_B)((Mg_{1/3}Nb_{2/3})_a(Ni_{1/3}Nb_{2/3})_b Zr_cTi_d)O_3$, in the formula, C is one of calcium (Ca), strontium (Sr), and barium (Ba), $a+b+c+d=1$, $0.02 \le B \le 0.20$, $0.80 \le A-B \le 0.98$, $0.05 \le a \le 0.25$, $0.05 \le b \le 0.25$, $0.10 \le c \le 0.50$, and $0.10 \le d \le 0.50$.

* * * * *